United States Patent
Sekiya

(10) Patent No.: US 10,733,272 B2
(45) Date of Patent: Aug. 4, 2020

(54) CONTROL APPARATUS, AUTHENTICATION APPARATUS, CONTROL SYSTEM, AND CONTROL METHOD

(71) Applicant: SONY CORPORATION, Tokyo (JP)

(72) Inventor: Shuichi Sekiya, Saitama (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 15/745,796

(22) PCT Filed: Jun. 21, 2016

(86) PCT No.: PCT/JP2016/068430
§ 371 (c)(1),
(2) Date: Jan. 18, 2018

(87) PCT Pub. No.: WO2017/022353
PCT Pub. Date: Feb. 9, 2017

(65) Prior Publication Data
US 2019/0005211 A1    Jan. 3, 2019

(30) Foreign Application Priority Data
Aug. 5, 2015   (JP) .................................. 2015-154827

(51) Int. Cl.
*G06F 21/44*    (2013.01)
*G06F 21/31*    (2013.01)
*G06F 21/12*    (2013.01)
*G06F 21/45*    (2013.01)

(52) U.S. Cl.
CPC .............. *G06F 21/31* (2013.01); *G06F 21/12* (2013.01); *G06F 21/44* (2013.01); *G06F 21/45* (2013.01)

(58) Field of Classification Search
CPC ....................................................... G06F 21/44
See application file for complete search history.

(56) References Cited

U.S. PATENT DOCUMENTS

| 2002/0029343 | A1 | 3/2002 | Kurita |
| 2008/0283595 | A1 | 11/2008 | Kimura et al. |
| 2009/0235069 | A1* | 9/2009 | Sonnega ............... H04L 63/062 713/156 |
| 2010/0161975 | A1* | 6/2010 | Ducharme .............. G06F 21/51 713/164 |

(Continued)

FOREIGN PATENT DOCUMENTS

| CN | 101309267 A | 11/2008 |
| EP | 2003589 A2 | 12/2008 |

(Continued)

OTHER PUBLICATIONS

International Search Report and Written Opinion of PCT Application No. PCT/JP2016/068430, dated Aug. 2, 2016, 10 pages of ISRWO.

*Primary Examiner* — Thaddeus J Plecha
(74) *Attorney, Agent, or Firm* — Chip Law Group

(57) ABSTRACT

There is provided a control apparatus including a secure storage unit and a processing unit that controls a control target on a basis of authenticated information that is stored in the secure storage unit and the authentication information is authenticated by an authentication apparatus. The processing unit controls the control target by controlling execution of an application.

15 Claims, 11 Drawing Sheets

(56) References Cited

U.S. PATENT DOCUMENTS

| | | | | |
|---|---|---|---|---|
| 2013/0097656 A1* | 4/2013 | Kennedy | ............... | G06F 21/57 |
| | | | | 726/1 |
| 2013/0205385 A1* | 8/2013 | Roesner | ............. | G06F 21/6245 |
| | | | | 726/17 |
| 2013/0347096 A1* | 12/2013 | Lee | ....................... | G06F 21/30 |
| | | | | 726/17 |
| 2014/0215206 A1* | 7/2014 | Courtney | ............. | H04L 9/3268 |
| | | | | 713/156 |
| 2015/0088339 A1* | 3/2015 | Fisher | ..................... | A61G 3/00 |
| | | | | 701/2 |
| 2015/0254438 A1* | 9/2015 | Odom | ................... | G06F 16/00 |
| | | | | 726/27 |
| 2015/0329121 A1* | 11/2015 | Lim | ..................... | G05B 15/02 |
| | | | | 701/36 |
| 2015/0372825 A1* | 12/2015 | Park | ................... | H04L 9/3268 |
| | | | | 713/156 |
| 2016/0048688 A1* | 2/2016 | Flynn | ................. | G06F 21/6281 |
| | | | | 713/193 |

FOREIGN PATENT DOCUMENTS

| | | |
|---|---|---|
| JP | 2002-157554 A | 5/2002 |
| JP | 2008-139918 A | 6/2008 |
| JP | 2008-287335 A | 11/2008 |
| JP | 2011-070348 A | 4/2011 |
| JP | 2012-256321 A | 12/2012 |
| WO | 2014/021053 A1 | 2/2014 |
| WO | 2014/141642 A1 | 9/2014 |

* cited by examiner

| Property | ID |
|---|---|
| Target Device | TD ID |
| Interface Device | IFD ID |
| ⋮ | |

FIG. 7A — Target Device row
FIG. 7B — Interface Device row

FIG. 8

| FUNC/APP | ID1 | ID2 | ID3 | · · · | IDN |
|---|---|---|---|---|---|
| #1 | ✔ |  | ✔ |  |  |
| #2 |  | ✔ |  |  |  |
| #3 |  |  | ✔ |  |  |
| ⋮ |  |  |  |  |  |
| #M |  |  |  |  |  |

CONTROL APPARATUS, AUTHENTICATION APPARATUS, CONTROL SYSTEM, AND CONTROL METHOD

CROSS REFERENCE TO RELATED APPLICATIONS

This application is a U.S. National Phase of International Patent Application No. PCT/JP2016/068430 filed on Jun. 21, 2016, which claims priority benefit of Japanese Patent Application No. 2015-154827 filed in the Japan Patent Office on Aug. 5, 2015. Each of the above-referenced applications is hereby incorporated herein by reference in its entirety.

TECHNICAL FIELD

The present disclosure relates to a control apparatus, an authentication apparatus, a control system, and a control method.

BACKGROUND ART

Techniques for achieving secure transfer of information by using information held in a contactless communication tag capable of near field communication have been developed. An example of the techniques for achieving secure transfer of information by performing processing depending on identification information held in the contactless communication tag after the contactless communication tag is authenticated on the basis of the authentication information held in the contactless communication tag includes the technique disclosed in Patent Literature 1 below.

CITATION LIST

Patent Literature

Patent Literature 1: WO 2014/021053

DISCLOSURE OF INVENTION

Technical Problem

With the development of information and communications technology (ICT), more various kinds of services can be provided today. In the future, it is contemplated that services are provided by using a vertically integrated service model in which one service provider alone provides services, and additionally, for example, "services are provided for a certain target by a plurality of service providers such as service providers of different industries". The "services are provided for a certain target by a plurality of service providers such as service providers of different industries" as described above can allow the user to receive various services, for example, by using a device that supports services to be provided.

The present disclosure proposes a new and improved control apparatus, authentication apparatus, control system, and control method, capable of allowing a plurality of service providers to provide services.

Solution to Problem

According to the present disclosure, there is provided a control apparatus including: a secure storage unit; and a processing unit configured to control a control target on a basis of authenticated information that is stored in the secure storage unit and is authenticated by an authentication apparatus.

In addition, according to the present disclosure, there is provided an authentication apparatus including: a processing unit configured to separately authenticate a provider of an application and a control apparatus including a secure storage unit, and, in a case where each authentication is normally completed, to cause authenticated information corresponding to the application to be recorded in the secure storage unit of the control apparatus.

In addition, according to the present disclosure, there is provided a control system including: a control apparatus; and an authentication apparatus. The control apparatus includes a secure storage unit, and a processing unit configured to control a control target on a basis of authenticated information that is stored in the secure storage unit and is authenticated by the authentication apparatus, and the authentication apparatus includes a processing unit configured to separately authenticate a provider of an application and the control apparatus, and, in a case where each authentication is normally completed, to cause authenticated information corresponding to the application to be recorded in the secure storage unit of the control apparatus.

In addition, according to the present disclosure, there is provided a control method that is executed by a control apparatus, the method including: a step of controlling a control target on a basis of authenticated information that is stored in a secure storage unit and is authenticated by an authentication apparatus.

In addition, according to the present disclosure, there is provided a control method including: a step of separately authenticating, by an authentication apparatus, a provider of an application and a control apparatus including a secure storage unit, and, in a case where each authentication is normally completed, causing authenticated information corresponding to the application to be recorded in the secure storage unit of the control apparatus; and a step of controlling, by the control apparatus, a control target on a basis of authenticated information that is stored in a secure storage unit and is authenticated by the authentication apparatus.

Advantageous Effects of Invention

According to the present disclosure, it is possible to allow a plurality of service providers to provide services.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 7A and 7B are explanatory diagrams for describing an example of processing relating to a control method in the authentication apparatus according to the present embodiment.

FIG. 8 is an explanatory diagram for describing an example of the processing relating to the control method in the authentication apparatus according to the present embodiment.

MODES(S) FOR CARRYING OUT THE INVENTION

Figure 1:
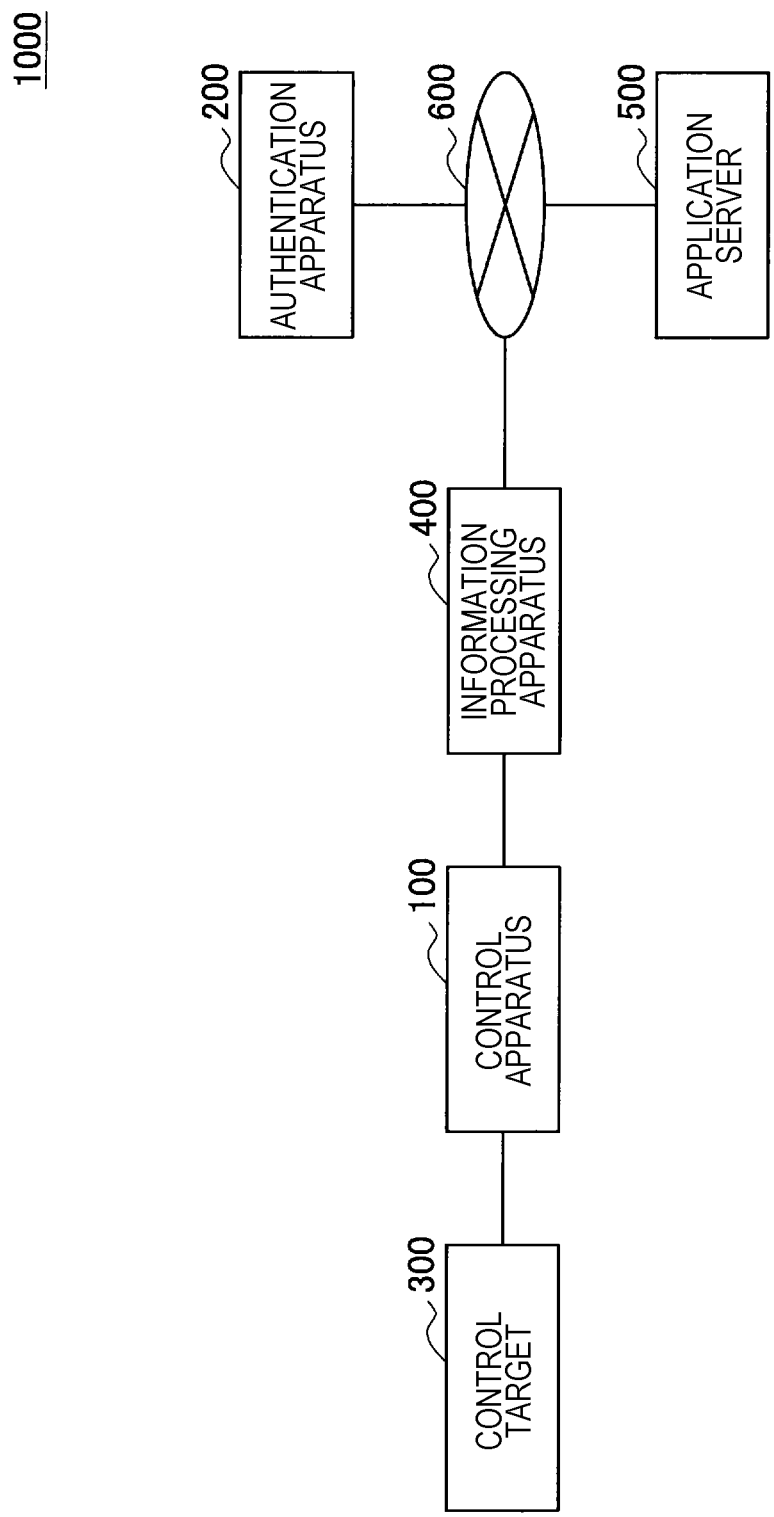
FIG. 1 is a block diagram illustrating an example of a configuration of a control system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the following, the description will be given in the order shown below.
1. Control system according to present embodiment and control method according to present embodiment
2. Program according to present embodiment
(Control System According to Present Embodiment and Control Method According to Present Embodiment)
In the following, a control method according to the present embodiment will be described while describing an overview and configuration of a control system according to the present embodiment.
[1] Overview of Control System According to Present Embodiment
As described above, in the future, it is contemplated that services are provided by using a vertically integrated service model in which one service provider alone provides services, and additionally, for example, "services are provided for a certain target by a plurality of service providers such as service providers of different industries".

As an example, an overview of a control system according to the present embodiment will be described below by taking the provision of services using an automobile as an example. Note that the control system according to the present embodiment is not limited to a system relating to the provision of services using an automobile, but is applicable to any system capable of providing services by a plurality of service providers. Use cases that are achievable by using the control system according to the present embodiment will be described later.

In an automobile, the use of ICT-related communication such as V2X (vehicle-to-vehicle communication and/or road-to-vehicle communication) or communication using a communication device including smartphones and the like can allow the user to receive various services of various industries such as automotive industry, ICT industry, nursing care industry, civil engineering industry, and retail industry, for example, by using the automobile. Thus, there is a possibility that various services using the automobile are achievable by linking between the automobile and ICT.

Here, in the automotive industry, safety is of utmost importance and the concept of fail-safe underlies. In addition, in the case where problems occur in an automobile, the manufacturer is sometimes responsible for the damage under the product liability (PL) law or the like.

On the other hand, in the ICT industry, even if the security is defective, the user is often responsible for the problem caused by the security defect.

Thus, for example, in order to ensure the linkage between an automobile and ICT and to achieve the provision of ICT-related services using the automobile, there is a high possibility that it is necessary to have a system capable of linking between the automobile and ICT and a system capable of obtaining a responsibility demarcation point.

Thus, the control system according to the present embodiment includes an authentication apparatus and a control apparatus provided with a secure storage unit.

The authentication apparatus separately authenticates a provider of an application corresponding to a service (corresponding to a provider of a service, and the provider of an application will be hereinafter referred to as a "provider of service" or a "service provider" in some cases) and the control apparatus. Then, in the case where each authentication is normally completed, the authentication apparatus causes authenticated information corresponding to the application to be recorded in the secure storage unit of the control apparatus. An example of the configuration of the authentication apparatus and its more specific processing will be described later. In addition, the authenticated information according to the present embodiment will be described later.

Further, the control apparatus controls a control target, on the basis of the authenticated information that is stored in the secure storage unit and is authenticated by the authentication apparatus. The processing of controlling a control target in the control apparatus is hereinafter referred to as "control processing" in some cases. In addition, an example of the configuration of the control apparatus, more specific processing in the control apparatus, and the control target will be described later.

The following three responsibility demarcation points are obtained, for example, by allowing the authentication apparatus and the control apparatus included in the control system according to the present embodiment to perform the processing as described above (processing relating to the control method in the control system according to the present embodiment).

The control apparatus is authenticated by the authentication apparatus, and then the authenticated information is recorded in the secure storage unit of the control apparatus (responsibility demarcation point 1).

A control target is controlled in accordance with the security policy of the control target because the control apparatus performs control processing on the basis of the authenticated information (responsibility demarcation point 2).

A provider of an application is authenticated by the authentication apparatus, and then the authenticated information is recorded in the secure storage unit of the control apparatus (responsibility demarcation point 3).

Further, it is possible to correlate each of a plurality of control targets of different manufacturers with each service by a plurality of service providers by allowing the authentication apparatus and the control apparatus included in the control system according to the present embodiment to perform the processing as described above (processing relating to the control method in the control system according to the present embodiment).

Thus, the control system is achieved in which services can be provided by a plurality of service providers by allowing the authentication apparatus and the control apparatus to perform the processing as described above (processing relating to the control method in the control system according to the present embodiment).

Here, in the control system according to the present embodiment, the authentication apparatus plays a neutral role as a third party of the provider of services.

Further, in the control system according to the present embodiment, the authentication apparatus authenticates the provider of services and the control apparatus, but the authentication apparatus does not manage information relating to user identification, such as data relating to authentication of the user who receives services. Thus, the control system according to the present embodiment that includes the authentication apparatus is capable of dealing with various types of services which are not dependent on association between the control target and the user, such as services in which the control target and the user are associated with each other, or not associated with each other. Note that, needless to say, it is technically possible that "the authentication apparatus manages information relating to user identification".

Further, in the control system according to the present embodiment, the control apparatus performing the control processing to control the control target makes it possible to, for example, ensure security and safety of the control target.

[2] Configuration of Control System According to Present Embodiment

Next, the processing relating to the control method according to the present embodiment will be described more specifically while describing an example of the configuration of the control system according to the present embodiment.

FIG. 1 is a block diagram illustrating an example of the configuration of a control system 1000 according to the present embodiment. The control system 1000 includes, for example, a control apparatus 100, an authentication apparatus 200, a control target 300, an information processing apparatus 400, and an application server 500.

The control apparatus 100 and the control target 300 are connected to each other, for example, in a wired or wireless manner. To give a specific example, in a case where the control target 300 is, for example, an automobile, the control apparatus 100 and the control target 300 are connected to each other by an interface called OBD2 (On Board Diagnosis second generation 2), and communicate with each other in accordance with a predetermined protocol such as the controller area network (CAN) protocol. Note that the communication between the control apparatus 100 and the control target 300 is not limited to the above example, but the control apparatus 100 and the control target 300 are capable of communicating with each other using any communication scheme and any communication protocol.

Further, the control apparatus 100 and the information processing apparatus 400 are connected to each other, for example, in a wired or wireless manner. To give a specific example, the control apparatus 100 and the information processing apparatus 400 communicate with each other by, for example, near field communication (NFC) or the communication based on IEEE802.15.1 standard. Note that the communication between the control apparatus 100 and the information processing apparatus 400 is not limited to the above example, but the control apparatus 100 and the information processing apparatus 400 are capable of communicating with each other using any communication scheme and any communication protocol.

Further, the authentication apparatus 200, the information processing apparatus 400, and the application server 500 are connected via, for example, a network 600. Examples of the network 600 include a wired network such as local area network (LAN) and wide area network (WAN), a wireless network such as wireless local area network (WLAN), the Internet using communication protocols such as transmission control protocol/Internet protocol (TCP/IP), or the like.

Note that the configuration of the control system according to the present embodiment is not limited to the configuration illustrated in FIG. 1.

For example, the control system according to the present embodiment may include the information processing apparatus 400. In the case where the information processing apparatus 400 is not included, the control apparatus 100 communicates with the authentication apparatus 200 via the network 600 (or directly).

Further, although FIG. 1 illustrates one application server 500, the control system according to the present embodiment may include, for example, an application server 500 for each service provider, that is, a plurality of application servers 500.

Further, FIG. 1 illustrates a configuration in which the authentication apparatus 200 communicates with the information processing apparatus 400 and the application server 500 via the network 600. However, a configuration may be employed in which the authentication apparatus 200 directly communicates with the information processing apparatus 400 and the application server 500.

[2-1] Control Apparatus 100

The control apparatus 100 includes, for example, a secure storage unit (to be described later), and controls (processing relating to the control method in the control apparatus 100) the control target 300 on the basis of the authenticated information stored in the secure storage unit.

Here, the authenticated information according to the present embodiment is data that is authenticated by the authentication apparatus 200, and is referred to by the control apparatus 100 at the time of controlling the control target 300. Examples of the authenticated information according to the present embodiment include data, such as application ID, indicating an application. In addition, the authenticated information according to the present embodiment may be, for example, a table (or a database. The same applies below.) in which data indicating an application is associated with a function of the control target 300.

The processing relating to the control method in the control apparatus 100 will be described below while describing an example of the configuration of the control apparatus 100.

Figure 2:
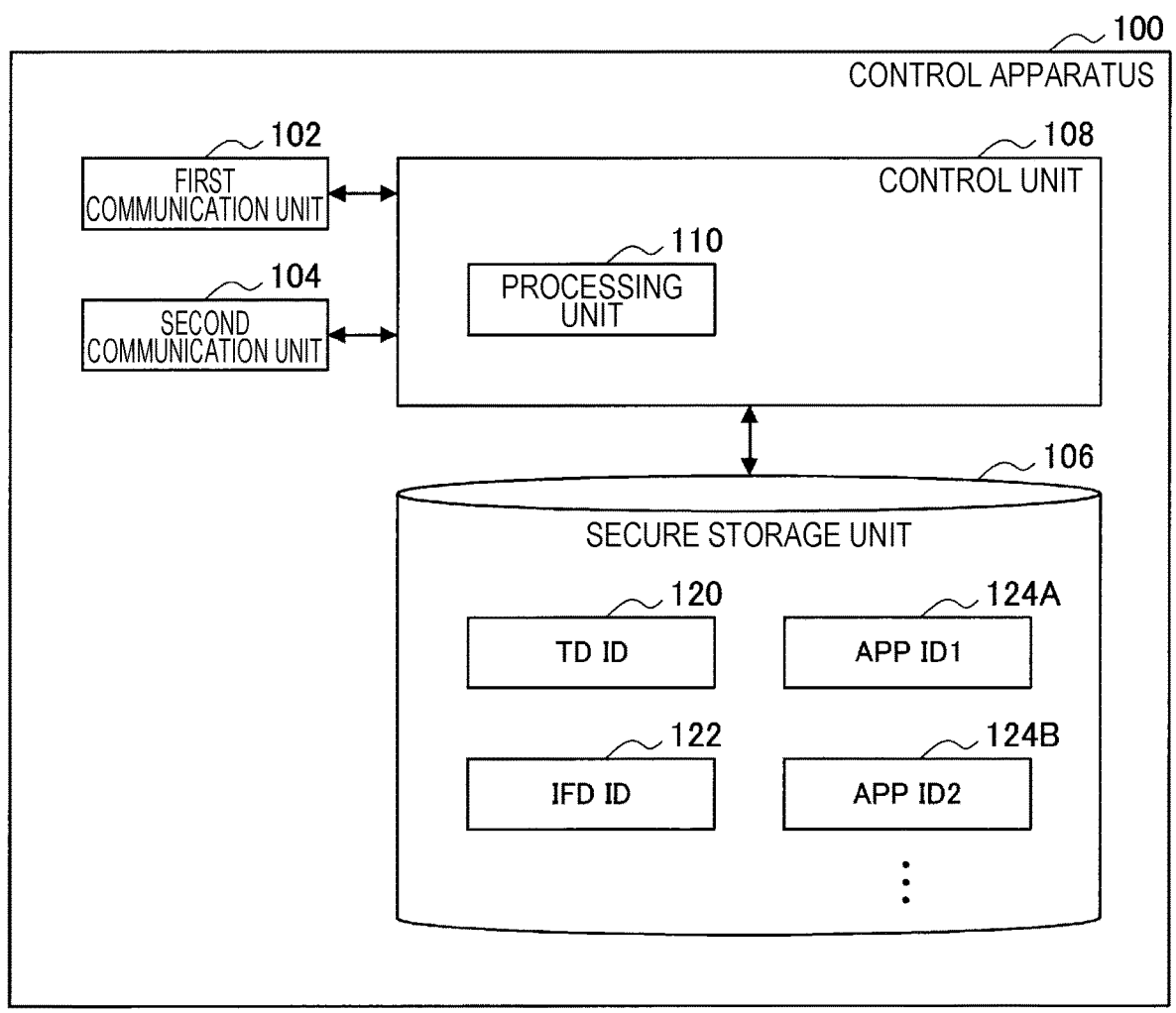
FIG. 2 is a block diagram illustrating an example of a configuration of a control apparatus according to the present embodiment.

FIG. 2 is a block diagram illustrating an example of the configuration of the control apparatus 100 according to the present embodiment. The control apparatus 100 includes, for example, a first communication unit 102, a second communication unit 104, a secure storage unit 106, and a control unit 108.

Further, the control apparatus 100 may include, for example, a read-only memory (ROM, not illustrated), a random-access memory (RAM, not illustrated), another storage unit (not illustrated), an operation unit (not illustrated)

operable by a user, a display unit (not illustrated) that displays various screens on a display screen, and the like. In the control apparatus 100, the respective components described above are connected with each other, for example, via a bus acting as a data transmission channel.

The ROM (not illustrated) stores control data such as a program or operation parameter used by the control unit 108. The RAM (not illustrated) temporarily stores a program or the like executed by the control unit 108.

The other storage unit (not illustrated) is a storage means included in the control apparatus 100, and stores, for example, various data such as applications. The other storage unit (not illustrated) does not have to have tamper resistance, which is different from the secure storage unit 106. Here, examples of the other storage unit (not illustrated) include a magnetic recording medium such as hard disks, a nonvolatile memory such as flash memories, or the like. In addition, the other storage unit (not illustrated) may be detachable from the control apparatus 100.

Examples of the operation input (not illustrated) include an operation input device to be described later. In addition, examples of the display unit (not illustrated) include a display device to be described later.

[Hardware Configuration Example of Control Apparatus 100]

Figure 3:
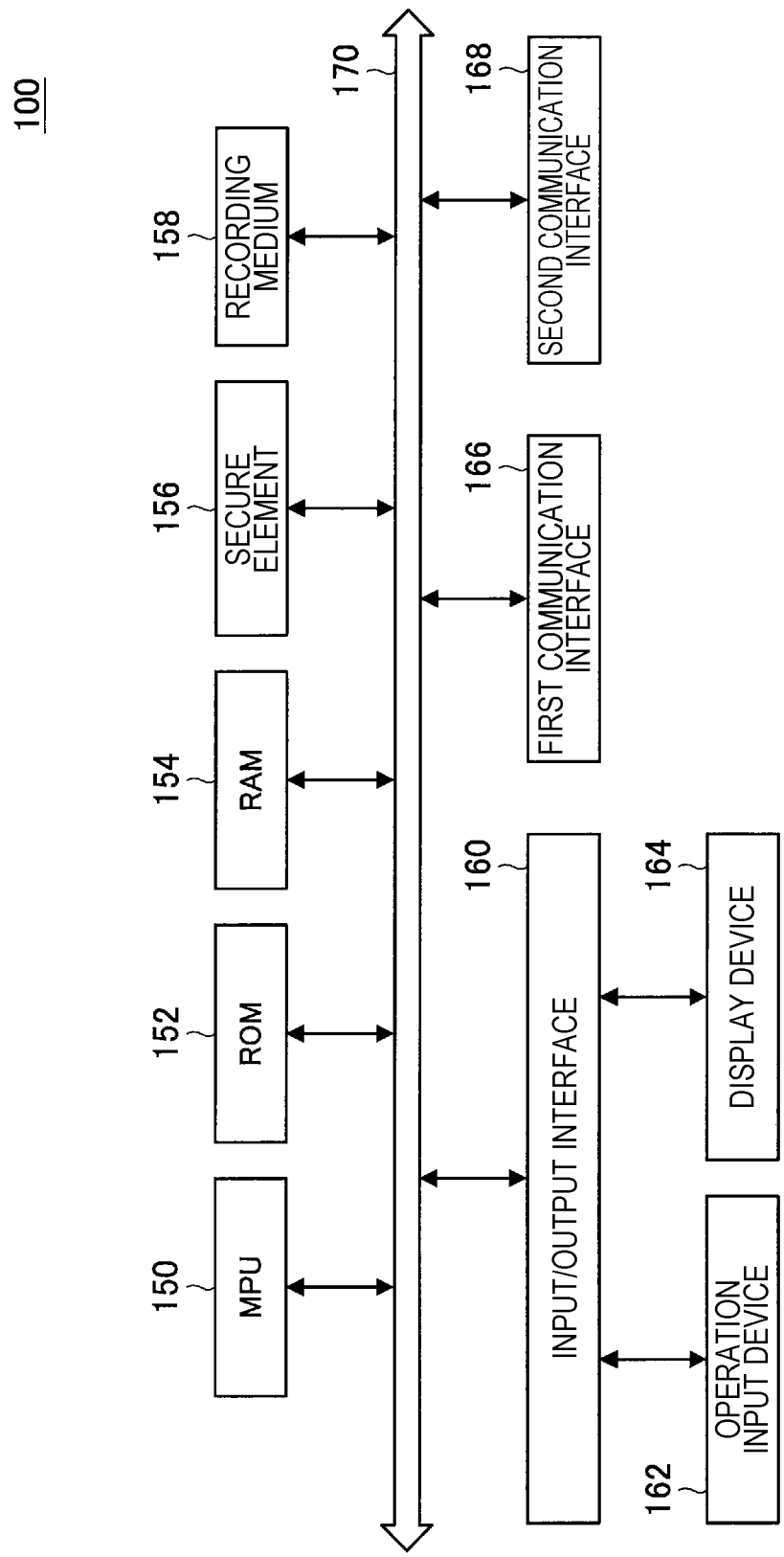
FIG. 3 is an explanatory diagram illustrating an example of a hardware configuration of the control apparatus according to the present embodiment.

FIG. 3 is an explanatory diagram illustrating an example of the hardware configuration of the control apparatus 100 according to the present embodiment. The control apparatus 100 includes, for example, an MPU 150, a ROM 152, a RAM 154, a secure element 156, a recording medium 158, an input/output interface 160, an operation input device 162, a display device 164, a first communication interface 166, and a second communication interface 168. In addition, in the control apparatus 100, the respective components are connected with each other, for example, via a bus 170 acting as a data transmission channel.

The MPU 150 includes, for example, one or more processors including an arithmetic circuit such as a micro processing unit (MPU), various processing circuits, or the like, and functions as the control unit 108 that controls the entire control apparatus 100. In addition, in the control apparatus 100, the MPU 150 plays a role, for example, of a processing unit 110 to be described later. Note that the processing unit 110 may include a dedicated (or general-purpose) circuit or the like (e.g., a processor different from the MPU 150) capable of achieving processing of the processing unit 110.

The ROM 152 stores control data or the like, such as programs or operation parameters, which is used by the MPU 150. The RAM 154 temporarily stores, for example, a program or the like to be executed by the MPU 150.

The secure element 156 is a tamper-resistant recording medium and functions as the secure storage unit 106. The secure element 156 may be detachable from the control apparatus 100.

The secure element 156 stores, for example, the authenticated information.

Note that the data stored in the secure element 156 is not limited to the authenticated information.

For example, the secure element 156 may store authentication information used for authentication of the control apparatus 100. Examples of the authentication information according to the present embodiment include data used for authentication by any authentication scheme, such as an ID (example of authentication information used for authentication by an ID management system) of the control apparatus 100 and key information (example of authentication information used for authentication by a key authentication scheme).

In addition, the secure element 156 may store, for example, identification information, such as an ID of the control target 300, indicating the control target 300.

The recording of data in the secure element 156 and the change or deletion of the data stored in the secure element 156 are performed, for example, on the basis of an instruction issued from the authentication apparatus 200. In addition, the reading, changing, or the like of data stored in the secure element 156 may be limited by, for example, access restriction that is set in the authenticated information. In addition, the authentication information stored in the secure element 156 may be pre-stored data that is stored at the time of manufacturing the control apparatus 100 or the like.

The recording medium 158 functions as the other storage unit (not illustrated) and stores, for example, various data such as applications. Here, examples of the recording medium 158 include a magnetic recording medium such as hard disks, a nonvolatile memory such as flash memories, or the like. In addition, the recording medium 158 may be detachable from the control apparatus 100.

The input/output interface 160 connects, for example, the operation input device 162 or the display device 164. The operation input device 162 functions as the operation unit (not illustrated). Further, the display device 164 functions as the display unit (not illustrated). Here, examples of the input/output interface 160 include a universal serial bus (USB) terminal, a digital visual interface (DVI) terminal, a high-definition multimedia interface (HDMI, registered trademark) terminal, various processing circuits, or the like.

Further, the operation input device 162 is provided on, for example, the control apparatus 100, and is connected with the input/output interface 160 inside the control apparatus 100. Examples of the operation input device 162 include buttons, direction keys, a rotary selector such as jog dials, or combinations thereof.

Further, the display device 164 is provided on, for example, the control apparatus 100, and is connected with the input/output interface 160 inside the control apparatus 100. Examples of the display device 164 include a liquid crystal display (LCD), an organic electro-luminescence (EL) display (also referred to as an organic light emitting diode (OLED) display), or the like.

Note that, needless to say, the input/output interface 160 is capable of being connected to an external device such as an operation input device (e.g., a keyboard, a mouse, etc.) of the control apparatus 100, or an external display device. In addition, the display device 164 may be a device, such as a touch panel, capable of performing both display and user operation, for example.

The first communication interface 166 is a first communication means included in the control apparatus 100, and, for example, functions as the first communication unit 102 for performing wireless or wired communication with an external device such as the control target 300. Here, examples of the first communication interface 166 include the communication device (wireless communication) for NFC, the IEEE 802.15.1 port and transmitter-receiver circuit (wireless communication), the IEEE 802.11 port and transmitter-receiver circuit (wireless communication), the device such as devices including a connector called the data link coupler (DTC) which supports OBD2 (wired communication), the LAN terminal and transmitter-receiver circuit (wired communication), or the like.

The second communication interface 168 is a second communication means included in the control apparatus 100, and functions as the second communication unit 104 for performing wireless or wired communication with an external device such as the information processing apparatus 400. Here, examples of the second communication interface 168 include the communication device for NFC (wireless communication), the IEEE 802.15.1 port and transmitter-receiver circuit (wireless communication), the IEEE 802.11 port and transmitter-receiver circuit (wireless communication), the communication antenna and radio frequency (RF) circuit (wireless communication), the LAN terminal and transmitter-receiver circuit (wired communication), or the like.

The control apparatus 100 performs the processing relating to the control method according to the present embodiment, for example, by the configuration illustrated in FIG. 3. Note that the hardware configuration of the control apparatus 100 according to the present embodiment is not limited to the configuration illustrated in FIG. 3.

For example, in a case where the control apparatus 100 communicates with an external device or the like via an external communication device connected thereto, the control apparatus 100 does not have to include one or both of the first communication interface 166 and the second communication interface 168. In addition, the first communication interface 166 and the second communication interface 168 may be one communication interface. In a case where the first communication interface 166 and the second communication interface 168 are one communication interface, the communication interface has, for example, a function of communicating with one or more external devices in accordance with a plurality of communication schemes. The communication interface described above communicates, for example, with each of a plurality of devices such as the control target 300 or the information processing apparatus 400.

Further, the control apparatus 100 can do without, for example, one or two or more of the recording medium 158, the operation input device 162, and the display device 164.

Further, for example, a portion or an entirety of the configuration (or the configuration according to a modification) illustrated in FIG. 3 may be implemented by one or two or more integrated circuits (ICs).

Referring again to FIG. 2, an example of the configuration of the control apparatus 100 is described. The first communication unit 102 is a first communication means included in the control apparatus 100 and, for example, communicates with an external device such as the control target 300 in a wired or wireless manner. In addition, for example, the control unit 108 controls the communication of the first communication unit 102.

Here, examples of the first communication unit 102 include the device or the like such as devices including a connector called DTC, for example, which supports OBD2. Note that the configuration of the first communication unit 102 is not limited to the above configuration. For example, the first communication unit 102 can employ a configuration, such as a USB terminal and a transmitter-receiver circuit, which supports any communicable standard.

The second communication unit 104 is a second communication means included in the control apparatus 100, and, for example, communicates with an external device such as the information processing apparatus 400 in a wired or wireless manner. In addition, for example, the control unit 108 controls the communication of the second communication unit 104.

Here, examples of the second communication unit 104 include the communication device for NFC, the IEEE 802.15.1 port and transmitter-receiver circuit, or the like. Note that the configuration of the second communication unit 104 is not limited to the above configuration. For example, the second communication unit 104 can employ a configuration, such as a USB terminal or a transmitter-receiver circuit, which supports any communicable standard or any configuration capable of communicating with an external device via the network 600.

The secure storage unit 106 is a tamper-resistant recording medium. Examples of the secure storage unit 106 include the secure element. The secure storage unit 106 stores, for example, authenticated information, authentication information, or identification information indicating the control target 300, such as the ID of the control target 300.

FIG. 2 illustrates an example in which the secure storage unit 106 stores "TD ID 120" (an example of identification information indicating the control target 300) indicating the control target 300, "IFD ID 122" (an example of authentication information) indicating the control apparatus 100, and "APP ID1 124A", "APP ID2 124B", ... (an example of authenticated information) indicating applications. The IDs indicating applications will be generically referred to as "APP ID 124" below in some cases.

The recording of various information in the secure storage unit 106 and the change or deletion of various information stored in the secure storage unit 106 are performed by the control unit 108, for example, on the basis of an instruction issued from the authentication apparatus 200. In addition, the reading, changing, or the like of data that is stored in the secure storage unit 106 may be limited by, for example, access restriction that is set in the authenticated information. In addition, for example, the data, such as authentication information, stored in the secure storage unit 106 may be pre-stored data that is stored at the time of manufacturing the control apparatus 100 or the like.

The control unit 108 includes, for example, an MPU or the like, and plays a role of controlling the entire control apparatus 100. In addition, the control unit 108 includes, for example, the processing unit 110, and plays a leading role in performing the processing relating to the control method in the control apparatus 100.

The processing unit 110 plays a leading role in performing the processing relating to the control method in the control apparatus 100, and controls the control target 300 on the basis of the authenticated information stored in the secure storage unit 106.

The processing unit 110 performs, for example, processing mentioned of (1) or (2) below, as the processing relating to the control of the control target 300.

(1) First Example of Processing Relating to Control of Control Target 300

The processing unit 110 controls the control target 300 by controlling execution of an application on the basis of the authenticated information.

Specifically, the processing unit 110 restricts execution of an application that is not authenticated by the authentication apparatus 200 on the basis of the authenticated information. For example, the processing unit 110 restricts execution of an application that is not authenticated by the authentication apparatus 200 by preventing an application that is not indicated by the authenticated information from being executed or by preventing data related to an application being executed that is not indicated by the authenticated information to from being transmitted to the control target 300.

Here, the processing relating to execution of an application may be performed by the control apparatus 100 (e.g., the processing unit 110) or may be performed in an external device of the control apparatus 100, such as the information processing apparatus 400.

In the case where the processing relating to execution of an application is performed in the control apparatus 100, the processing unit 110 restricts execution of an application that is not authenticated by the authentication apparatus 200, for example, by not executing an application that is not authenticated by the authentication apparatus 200.

Further, in the case where the processing relating to execution of an application is performed in an external device, the processing unit 110 achieves "prevention of an application that is not indicated by the authenticated information from being executed", for example, by causing an instruction relating to restriction of execution of the application to be transmitted to the external device. In addition, in the case where the processing relating to execution of an application is performed in the external device, for example, when data of the application that is not indicated by the authenticated information is included in data acquired from the external device, the processing unit 110 achieves "prevention of data related to the application being executed that is not indicated by the authenticated information from being transmitted to the control target 300" by preventing the data from being transmitted to the control target 300.

Further, the processing unit 110 permits execution of an application that is authenticated by the authentication apparatus 200 on the basis of the authenticated information. For example, the processing unit 110 permits execution of an application that is authenticated by the authentication apparatus 200 by causing the application indicated by the authenticated information to be executed, or by causing data related to an application being executed that is indicated by the authenticated information to be transmitted to the control target 300.

In the case where the processing relating to execution of the application is performed in the control apparatus 100, the processing unit 110 executes, for example, the application that is authenticated by the authentication apparatus 200.

Further, in the case where the processing relating to execution of an application is performed in an external device, the processing unit 110 causes the external device to execute the application that is indicated by the authenticated information, for example, by causing an instruction relating to execution of an application to be transmitted to the external device. In addition, in the case where the processing relating to execution of an application is performed in an external device, for example, when data of the application that is indicated by the authenticated information is included in the data acquired from the external device, the processing unit 110 causes the data to be transmitted to the control target 300.

The processing unit 110 controls the control target 300, for example, by controlling execution of an application on the basis of the authenticated information as described above.

Further, in the case where the processing of the executed application is terminated, the processing unit 110 causes processing termination information indicating that the processing of the application is terminated to be transmitted to the authentication apparatus 200. Examples of the case where the processing of an executed application according to the present embodiment is terminated include "a case where a series of processing of an application is terminated" (e.g., a case where a series of processing is normally terminated or a case where a series of processing is terminated as exception handling), "a case where a series of processing of an application is terminated a predetermined number of times", or the like. Note that examples of the case where the processing of an executed application according to the present embodiment is terminated are not limited to the above example, but can be, for example, any case corresponding to types of an application or types of the control target, such as "a case where a predetermined period has elapsed since the application was first executed".

In the case where an application is executed in an external device such as the information processing apparatus 400, the processing unit 110 determines that the processing of the executed application is terminated, for example, when a notification that the application is terminated is issued from the external device, or when the termination of the executed application is detected from the data acquired from the external device.

The transmission of the processing termination information to the authentication apparatus 200 makes it possible for the authentication apparatus 200 to perform processing for resetting the authenticated information stored in the secure storage unit 106, such as "processing of transmitting an instruction to delete the authenticated information corresponding to the application whose processing is terminated from the secure storage unit 106", for example.

(2) Second Example of Processing Relating to Control of Control Target 300

The processing unit 110 controls the control target by further controlling the function of the control target on the basis of the authenticated information in addition to controlling the execution of the application according to the first example shown in (1) above.

As described above, as the authenticated information, "a table in which data indicating an application is associated with a function of the control target 300" can be given. In the case where the authenticated information is the table as described above, it is possible to control not only the execution of the application but also the function of the control target 300 by referring to the authenticated information. That is, in the case where the processing according to the second example is performed, it becomes possible to control the control target in more detail than in the case where the processing according to the first example shown in (1) above is performed.

Specifically, the processing unit 110 restricts the function of the control target 300 that is not authenticated by the authentication apparatus 200 on the basis of the authenticated information. The processing unit 110 restricts the function of the control target 300 that is not authenticated by the authentication apparatus 200, for example, by "preventing an application that is indicated by the authenticated information from executing the processing relating to the function that is not indicated by the authenticated information" or by "preventing data relating to a function that is not indicated by the authenticated information among data related to an application being executed that is indicated by the authenticated information from being transmitted to the control target 300".

In the case where the processing relating to execution of an application is performed in the control apparatus 100, the processing unit 110 restricts the function of the control target 300 that is not authenticated by the authentication apparatus 200, for example, by not executing the processing relating to the function that is not indicated by the authenticated information using an application that is authenticated by the authentication apparatus 200.

Further, in the case where the processing relating to execution of an application is performed in the external device, the processing unit 110 achieves "prevention of an application that is indicated by the authenticated information from executing the processing relating to the function that is not indicated by the authenticated information", for example, by causing an instruction relating to restriction of execution of the application to be transmitted to the external device. In addition, in the case where the processing relating to execution of an application is performed in the external device, for example, when data, which relates to the function that is not indicated by the authenticated information and relates to the application indicated by the authenticated information, is included in data acquired from the external device, the processing unit 110 prevents the data from being transmitted to the control target 300, thereby achieving "prevention of data relating to a function that is not indicated by the authenticated information among data related to an application being executed that is indicated by the authenticated information from being transmitted to the control target 300".

Further, the processing unit 110 enables the function of the control target 300 that is authenticated by the authentication apparatus 200 on the basis of the authenticated information. The processing unit 110 enables the function of the control target 300 that is authenticated by the authentication apparatus 200, for example, by "causing the application that is indicated by the authenticated information to execute the processing relating to the function that is not indicated by the authenticated information", or by "causing the data relating to the function that is indicated by the authenticated information among data related to the application being executed that is indicated by the authenticated information to be transmitted to the control target 300".

In the case where the processing relating to execution of an application is performed in the control apparatus 100, the processing unit 110 enables the function of the control target 300 that is authenticated by the authentication apparatus 200, for example, by executing the processing relating to the function that is indicated by the authenticated information by using an application that is authenticated by the authentication apparatus 200.

Further, in the case where the processing relating to execution of an application is performed in an external device, the processing unit 110 causes the external device to execute the processing relating to the function that is indicated by the authenticated information using the application indicated by the authenticated information, for example, by causing an instruction relating to execution of the application to be transmitted to the external device. In addition, in the case where the processing relating to execution of an application is performed in the external device, for example, when data, which relates to the function that is indicated by the authenticated information and relates to the application indicated by the authenticated information, is included in data acquired from the external device, the processing unit 110 causes the data to be transmitted to the control target 300.

The processing unit 110 controls the control target 300, for example, by further controlling the function of the control target on the basis of the authenticated information in addition to controlling the execution of the application according to the first example shown in (1) above, as described above.

The processing unit 110 controls the control target 300, for example, by performing the processing according to the first example shown in (1) above or the processing according to the second example shown in (2) above.

Figure 4:
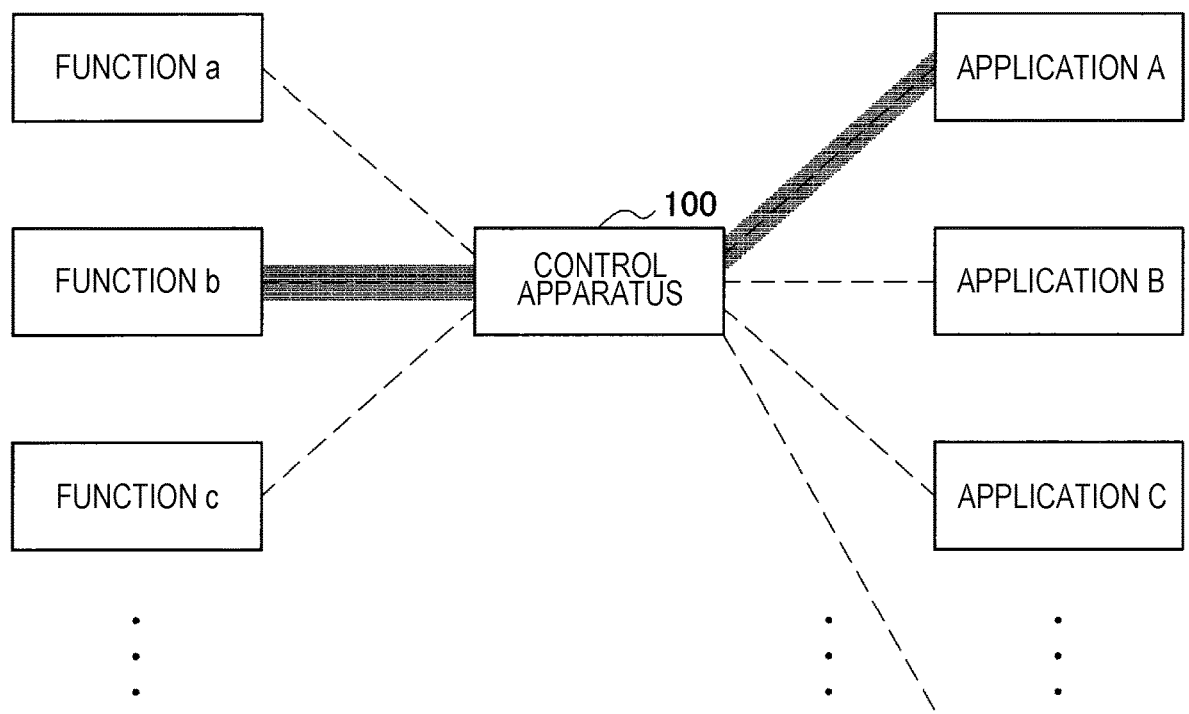
FIG. 4 is an explanatory diagram illustrating an example of processing relating to a control method in the control apparatus according to the present embodiment.

FIG. 4 is an explanatory diagram illustrating an example of the processing relating to the control method in the control apparatus 100 according to the present embodiment.

The processing unit 110 correlates the authenticated application to be executed with the function of the control target 300, for example, on the basis of the authenticated information as illustrated in FIG. 4. In other words, the processing unit 110 controls the control target 300 by controlling which application is allowed to perform processing relating to which function.

The control unit 108 includes, for example, the processing unit 110, and so plays a leading role in performing the processing of controlling the control target 300 (the processing relating to the control method in the control apparatus 100) on the basis of the authenticated information stored in the secure storage unit 106.

The control apparatus 100 performs the processing relating to the control method in the control apparatus 100, for example, with the configuration illustrated in FIG. 2.

Here, the control apparatus 100 controls the control target 300, on the basis of the authenticated information that is stored in the secure storage unit 106 and is authenticated by the authentication apparatus 200. Thus, the control apparatus 100 performs the processing relating to the control method in the control apparatus 100, thereby obtaining, for example, the above-described three responsibility demarcation points.

Further, the control target 300 is controlled on the basis of the authenticated information, and so, for example, as illustrated in FIG. 4, the authenticated application to be executed is correlated with the function of the control target 300. Thus, the control apparatus 100 is capable of correlating the control target 300 with each of the services provided by a plurality of service providers.

Thus, the control apparatus 100 includes, for example, the configuration illustrated in FIG. 2, and so it is possible to achieve the control system capable of providing services by a plurality of service providers.

Further, for example, with the configuration illustrated in FIG. 2, the control apparatus 100 can have the effect obtained by performing the processing relating to the control method in the control apparatus 100.

Note that the configuration of the control apparatus 100 according to the present embodiment is not limited to the configuration illustrated in FIG. 2.

For example, the control apparatus 100 according to the present embodiment can include the processing unit 110 illustrated in FIG. 2 as a component (e.g., implemented as a different processing circuit) different from the control unit 108.

Further, for example, the first communication unit 102 and the second communication unit 104 may be one communication unit.

Further, in the case of communicating with an external device via an external communication device having a function and configuration similar to those of the first communication unit 102 or in the case of communicating with an external device via an external communication device having a function and configuration similar to those of the second communication unit 104, the control apparatus 100 according to the present embodiment does not have to include one or both of the first communication unit 102 and the second communication unit 104.

The control apparatus 100 according to the present embodiment is applicable to, for example, various devices, such as a dongle, a communication device such as mobile phones or smartphones, a tablet device, or a computer such as personal computers (PCs), capable of performing the processing relating to the control method in the control apparatus 100. In addition, the control apparatus 100 and the control target 300 according to the present embodiment may be provided in the same device, such as an automobile that is a target to which the control target 300 is applicable. In addition, the control apparatus 100 and the control target 300 according to the present embodiment may be, for example, an integrated device. In addition, the present embodiment is also applicable to, for example, a processing IC that can be incorporated in the device as described above.

[2-2] Authentication Apparatus 200

The authentication apparatus 200 causes the secure storage unit 106 of the control apparatus 100 to record the authenticated information. The authentication apparatus 200 separately authenticates the provider of the application and the control apparatus 100, and in the case where each authentication is normally completed, the authentication apparatus 200 causes the secure storage unit 106 of the control apparatus 100 to record the authenticated information corresponding to the application (the processing relating to the control method in the authentication apparatus 200).

The processing relating to the control method in the authentication apparatus 200 is described below while describing an example of the configuration of the authentication apparatus 200.

Figure 5:
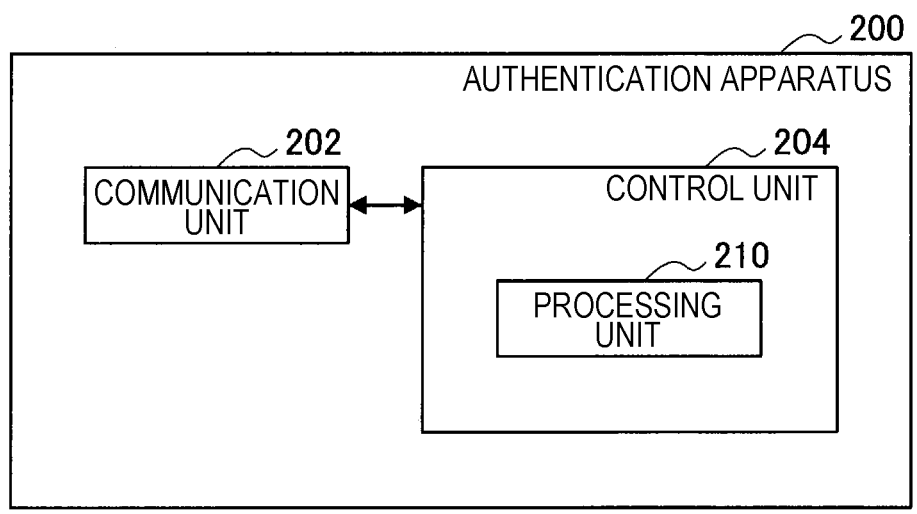
FIG. 5 is a block diagram illustrating an example of a configuration of an authentication apparatus according to the present embodiment.

FIG. 5 is a block diagram illustrating an example of the configuration of the authentication apparatus 200 according to the present embodiment. The authentication apparatus 200 includes, for example, a communication unit 202 and a control unit 204.

Further, the authentication apparatus 200 may include, for example, a ROM (not illustrated), a RAM (not illustrated), a storage unit (not illustrated), an operation unit (not illustrated) operable by a user, a display unit (not illustrated) that displays various screens on a display screen, and the like. In the authentication apparatus 200, the respective components described above are connected with each other, for example, via a bus acting as a data transmission channel.

The ROM (not illustrated) stores control data such as a program or operation parameter used by the control unit 204. The RAM (not illustrated) temporarily stores a program or the like executed by the control unit 204.

The storage unit (not illustrated) is a storage means included in the authentication apparatus 200, and stores, for example, various data including data, such as information used for authentication (to be described later) relating to the control method according to the present embodiment, various applications, or the like. Here, examples of the storage unit (not illustrated) include, for example, a magnetic recording medium such as hard disks, a nonvolatile memory such as flash memories, or the like. In addition, the storage unit (not illustrated) may be detachable from the authentication apparatus 200.

Examples of the operation input (not illustrated) include an operation input device to be described later. In addition, examples of the display unit (not illustrated) include a display device to be described later.

[Example of Hardware Configuration of Authentication Apparatus 200]

Figure 6:
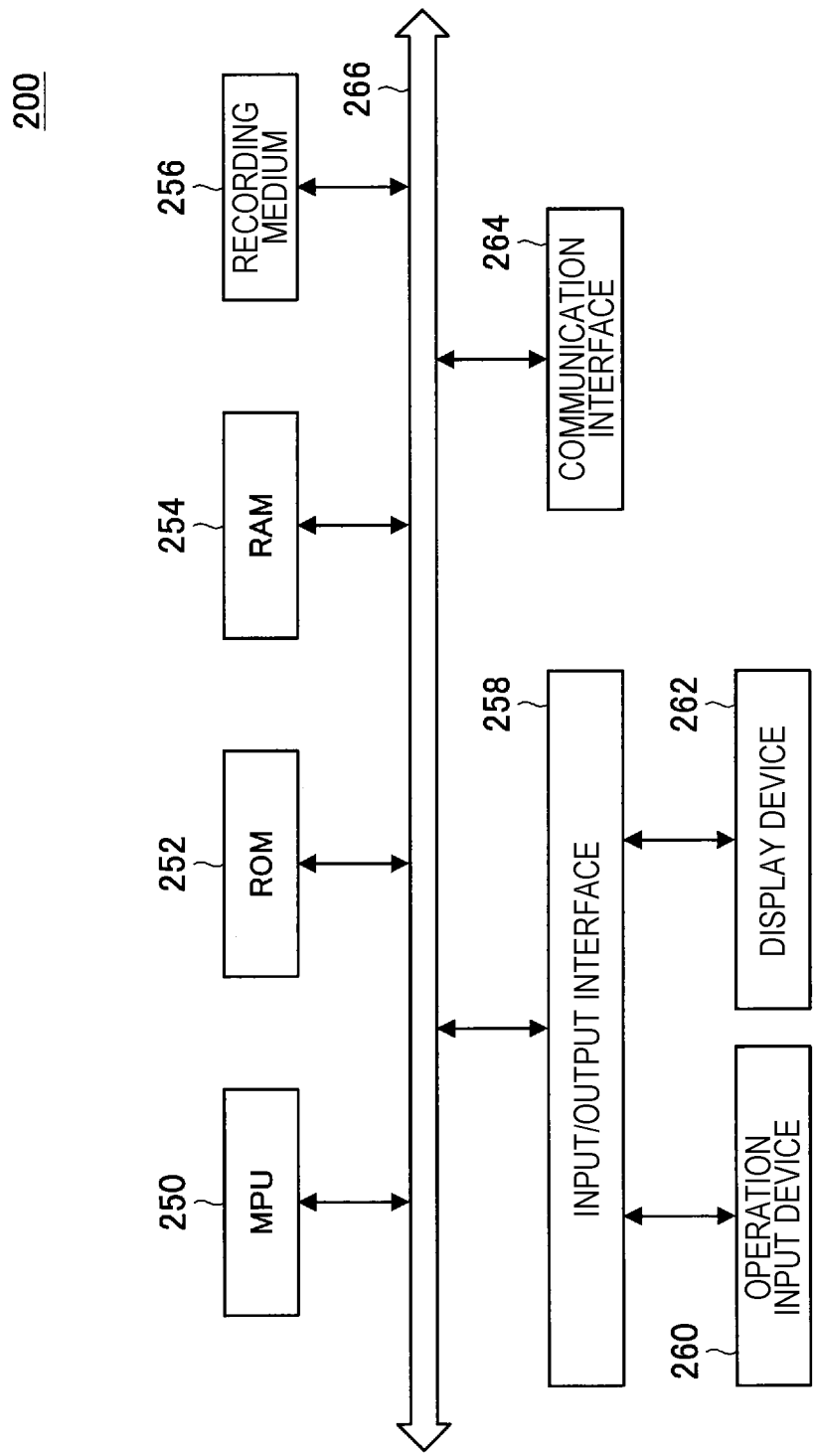
FIG. 6 is an explanatory diagram illustrating an example of a hardware configuration of the authentication apparatus according to the present embodiment.

FIG. 6 is an explanatory diagram illustrating an example of the hardware configuration of the authentication apparatus 200 according to the present embodiment. The authentication apparatus 200 includes, for example, an MPU 250, a ROM 252, a RAM 254, a recording medium 256, an input/output interface 258, an operation input device 260, a display device 262, and a communication interface 264. In addition, in the authentication apparatus 200, the respective components are connected with each other, for example, via a bus 266 acting as a data transmission channel.

The MPU 250 includes, for example, one or more processors including an arithmetic circuit such as an MPU, various processing circuits, or the like, and functions as the control unit 204 that controls the entire authentication apparatus 200. In addition, in the authentication apparatus 200, the MPU 250 plays a role, for example, of a processing unit 110 to be described later. Note that the processing unit 210 may include a dedicated (or general-purpose) circuit or the like (e.g., a processor different from the MPU 250) capable of achieving processing of the processing unit 210.

The ROM 252 stores control data or the like, such as programs or operation parameters, which is used by the MPU 250. The RAM 254 temporarily stores, for example, a program or the like to be executed by the MPU 250.

The recording medium 256 functions as the storage unit (not illustrated) and stores, for example, various data including data, such as information used for authentication (to be described later), relating to the control method according to the present embodiment, various applications, or the like. Here, examples of the recording medium 256 include a magnetic recording medium such as hard disks or a nonvolatile memory such as flash memories. In addition, the recording medium 256 may be detachable from the authentication apparatus 200.

The input/output interface 258 connects, for example, the operation input device 260 or the display device 262. The operation input device 260 functions as the operation unit (not illustrated), and the display device 262 functions as the display unit (not illustrated). Here, examples of the input/output interface 258 include a USB terminal, a DVI terminal, an HDMI (registered trademark) terminal, various processing circuits, and the like.

Further, the operation input device 260 is provided on, for example, the authentication apparatus 200, and is connected with the input/output interface 258 inside the authentication apparatus 200. Examples of the operation input device 260 include buttons, direction keys, a rotary selector such as jog dials, or combinations thereof.

Further, the display device 262 is provided, for example, on the authentication apparatus 200, and is connected to the input/output interface 258 inside the authentication apparatus 200. Examples of the display device 262 include a liquid crystal display, an organic EL display, or the like.

Note that, needless to say, the input/output interface 258 is capable of being connected to an external device such as an operation input device (e.g., a keyboard, a mouse, etc.) of the authentication apparatus 200, or an external display device. In addition, the display device 262 may be a device, such as a touch panel, capable of performing both display and user operation, for example.

The communication interface 264 is a communication means included in the authentication apparatus 200, and functions as the communication unit 202 for performing wireless or wired communication, for example, with an external device such as the information processing apparatus 400 or the application server 500 via a network 600 (or directly). Here, examples of the communication interface 264 include the communication antenna and RF circuit (wireless communication), the IEEE 802.15.1 port and transmitter-receiver circuit (wireless communication), the IEEE 802.11 port and transmitter-receiver circuit (wireless communication), the LAN terminal and transmitter-receiver circuit (wired communication), or the like.

The authentication apparatus 200 performs the processing relating to the control method in the authentication apparatus 200, for example, by the configuration illustrated in FIG. 6. Note that the hardware configuration of the authentication apparatus 200 according to the present embodiment is not limited to the configuration illustrated in FIG. 6.

For example, in the case where the authentication apparatus 200 communicates with an external device or the like via an external communication device being connected thereto, the authentication apparatus 200 does not have to include the communication interface 264. In addition, the communication interface 264 may be configured to be capable of communicating with one or two or more external devices or the like in accordance with a plurality of communication schemes.

Further, the authentication apparatus 200 can do without, for example, one or two or more of the recording medium 256, the operation input device 260, and the display device 262.

Further, for example, a portion or an entirety of the configuration (or the configuration according to a modification) illustrated in FIG. 6 may be implemented by one or two or more ICs.

Referring again to FIG. 5, an example of the configuration of the authentication apparatus 200 is described. The communication unit 202 is a communication means included in the authentication apparatus 200 and communicates with an external device such as the information processing apparatus 400 or the application server 500 via the network 600 (or directly) in a wireless or wired manner. In addition, for example, the control unit 204 controls the communication of the communication unit 202.

Here, examples of the communication unit 202 include the communication antenna and RF circuit, the LAN terminal and transmitter-receiver circuit, or the like. Note that the configuration of the communication unit 202 is not limited to the above configuration. For example, the communication unit 202 can employ a configuration, such as a USB terminal or a transmitter-receiver circuit, which supports any communicable standard, or any configuration capable of communicating an external device via the network 600. In addition, the communication unit 202 may be configured to be capable of communicating with one or more external devices or the like in accordance with a plurality of communication schemes.

The control unit 204 includes, for example, an MPU or the like, and plays a role of controlling the entire authentication apparatus 200. In addition, the control unit 204 includes, for example, the processing unit 210, and plays a leading role in performing the processing relating to the control method in the authentication apparatus 200.

The processing unit 210 plays a leading role in performing the processing relating to the control method in the authentication apparatus 200.

The processing unit 210 separately authenticates, for example, the provider of the application and the control apparatus 100 including the secure storage unit 106.

FIGS. 7A and 7B are explanatory diagrams for describing an example of the processing relating to the control method in the authentication apparatus 200 according to the present embodiment, and illustrates an example of information used for authentication of the control apparatus. Note that, in FIGS. 7A and 7B, as information used for authentication of the control apparatus, a table is illustrated, but information used for authentication of the control apparatus according to the present embodiment is not limited to data in the table format.

The information used for authentication of the control apparatus includes, for example, an ID of a control target ("TD ID" shown in FIG. 7A) such as a vehicle ID (VID) and an ID of the control apparatus ("IFD ID" shown in FIG. 7A) corresponding to authentication information. In addition, the information used for authentication of the control apparatus may include, for example, an ID indicating the owner of the control apparatus, or the like.

Note that the information used for authentication of the control apparatus is not limited to the example illustrated in FIGS. 7A and 7B.

For example, the information used for authentication of the control apparatus does not have to include information other than the authentication information, such as the ID of the control target ("TD ID" shown in FIG. 7A), an ID indicating the owner of the control apparatus, and the like. That is, the information used for authentication of the control apparatus includes at least the authentication information.

Further, although FIGS. 7A and 7B illustrate an example in which the authentication information is an ID of the control apparatus, the authentication information may be data used for authentication by any authentication scheme, such as key information, as described above. In the case where the authentication information is key information, for example, data of an encryption key used for authentication by the key authentication scheme is included in the information used for authentication of the control apparatus.

For example, in the case where the information used for authentication of the control apparatus illustrated in FIGS. 7A and 7B is referred to, the processing unit 210 compares the ID of the control apparatus 100 that is acquired from the control apparatus 100 via the information processing apparatus 400 with the like with the ID of the control apparatus that is included in the information used for authentication of the control apparatus. Then, in the case where the ID of the control apparatus 100 that is acquired from the control apparatus 100 agrees with the ID of the control apparatus that included in the information used for authentication of the control apparatus, the processing unit 210 determines that the authentication of the control apparatus 100 is normally completed.

Further, the processing unit 110 performs the authentication using any authentication scheme, such as authentication by the ID management system or authentication by the key authentication scheme, through the communication with the application server 500, thereby authenticating the provider of the application, which is similar to the authentication of the control apparatus 100.

Then, in the case where the authentication of the provider of the application and the control apparatus 100 including the secure storage unit 106 is normally completed, the processing unit 210 causes the secure storage unit 106 of the control apparatus 100 to record the authenticated information corresponding to the application.

For example, the processing unit 210 sets an ID of the authenticated application as the authenticated information and causes the authenticated information and the recording instruction to be transmitted to the control apparatus 100, thereby causing the authenticated information to be recorded in the secure storage unit 106 of the control apparatus 100. In the control system 1000 illustrated in FIG. 1, the control apparatus 100 receives the authenticated information and the recording instruction via the network 600 and the information processing apparatus 400, and records the authenticated information in the secure storage unit 106 in accordance with the recording instruction.

Note that the authenticated information caused by the processing unit 210 to be recorded is not limited to the example described above.

For example, the processing unit 210 is also capable of causing the authenticated information corresponding to the identification information indicating the control target that is acquired from the control apparatus 100 to be recorded in the secure storage unit 106 of the control apparatus 100. Specifically, for example, the processing unit 210 sets the ID of the authenticated application and information (e.g., the ID of the function) indicating the function of the control target to be enabled as the authenticated information, and causes the authenticated information to be recorded in the secure storage unit 106 of the control apparatus 100.

Figure 8:
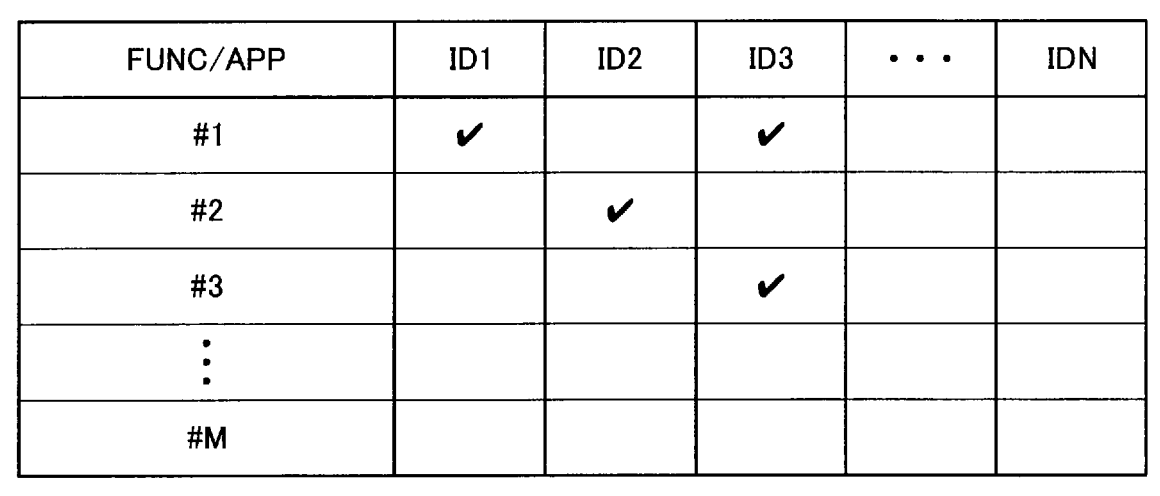

FIG. 8 is an explanatory diagram for describing an example of the processing relating to the control method in the authentication apparatus 200 according to the present embodiment, and illustrates an example of information used for generation of the authenticated information.

FIG. 8 illustrates, as the information used for generation of the authenticated information, a table in which an application is associated with the function of the control target.

Here, the association between the application and the function of the control target is set, for example, on the basis of the security policy of the control target. In addition, in the information used for generation of the authenticated information, access restriction depending on the state of the control target, restriction relating to control, such as reading, and recording/deletion, of the secure storage unit of the control apparatus, or the like may be defined.

Note that, needless to say, the information used for generation of the authenticated information is not limited to the data in the table format.

The information used for generation of the authenticated information may be, for example, data common to any control targets or may be data for each control target.

Further, the information used for generation of the authenticated information may be, for example, data for each state of the control target. Examples of the data for each state of the control target include data corresponding to the driving situation such as driving in the case where the control target is a moving object such as an automobile. The driving situation in the case where the control target is a moving object such as an automobile can be estimated, for example, by using any technique capable of estimating the driving situation, such as a method of analyzing log data obtained by execution of an application that collects conditions of the control target.

For example, in the case where the information used for generation of the authenticated information is the data for each control target, the processing unit 210 generates the authenticated information by using the information used for generation of the authenticated information, which corresponds to the ID of the control target 300 acquired from the control apparatus 100 via the information processing apparatus 400 or the like.

Further, the processing unit 210 may authenticate the control target 300 by, for example, using the ID of the control target 300 that is acquired from the control apparatus 100, and may generate the authenticated information in the case where the authentication is completed.

In the case of using the information used for generation of the authenticated information illustrated in FIG. 8, for example, the processing unit 210 sets the ID of the authenticated application and the ID indicating the function associated with the authenticated application as the authenticated information. Then, the processing unit 210 causes the authenticated information to be recorded in the secure storage unit 106 of the control apparatus 100 by causing the authenticated information and the recording instruction to be transmitted to the control apparatus 100.

The processing unit 210 causes the authenticated information to be recorded in the secure storage unit 106 of the control apparatus 100 as described above, thereby allowing the control apparatus 100 to perform the processing relating to the control method based on the authenticated information.

Further, it is possible for the processing unit 210 to control the recording of data in the secure storage unit 106 or the change or deletion of data stored in the secure storage unit 106, for example, by causing the instruction to change or delete the data stored in the secure storage unit 106 to be transmitted to the control apparatus 100 in addition to the recording instruction to record data in the secure storage unit 106 of the control apparatus 100.

To give an example, in the case where the processing termination information is acquired from the control apparatus 100, for example, the processing unit 210 causes the deletion instruction to delete the authenticated information corresponding to the application indicated by the processing termination information to be transmitted to the control apparatus 100. The transmission of the deletion instruction to the control apparatus 100 makes it possible for the processing unit 210 to cause the authenticated information corresponding to the application indicated by the processing termination information to be deleted from the secure storage unit 106 of the control apparatus 100. Here, the processing of causing the deletion instruction to be transmitted to the control apparatus 100 corresponds to processing for resetting the authenticated information stored in the secure storage unit 106 of the control apparatus 100.

The control unit 204 includes, for example, the processing unit 210, and so, in the case where the authentication of the provider of the application and the control apparatus 100 is normally completed, the control unit 204 plays a leading role in performing the processing of causing the authenticated information corresponding to the application to be recorded in the secure storage unit 106 of the control apparatus 100 (the processing relating to the control method in the authentication apparatus 200).

The authentication apparatus 200 performs the processing relating to the control method in the authentication apparatus 200, for example, with the configuration illustrated in FIG. 5.

Here, in the case where the authentication of the provider of the application and the control apparatus 100 is normally completed, the authentication apparatus 200 causes the authenticated information corresponding to the application to be recorded in the secure storage unit 106 of the control apparatus 100. Thus, the authentication apparatus 200 performs the processing relating to the control method in the authentication apparatus 200, thereby obtaining, for example, the above-described three responsibility demarcation points.

Further, in the control apparatus 100, the authentication apparatus 200 controls the control target 300 on the basis of the authenticated information recorded in the secure storage unit 106 of the control apparatus 100, thereby allowing the authenticated application to be executed and the function of the control target 300 to be associated with each other, for example, as illustrated in FIG. 4.

Thus, the authentication apparatus 200 includes, for example, the configuration illustrated in FIG. 5, and so it is possible to achieve the control system capable of providing services by a plurality of service providers.

Further, for example, with the configuration illustrated in FIG. 5, the authentication apparatus 200 can have the effect obtained by performing the processing relating to the control method in the authentication apparatus 200.

Note that the configuration of the authentication apparatus 200 according to the present embodiment is not limited to the configuration illustrated in FIG. 5.

For example, the authentication apparatus 200 according to the present embodiment can include the processing unit 210 illustrated in FIG. 5 as a component (e.g., implemented as a different processing circuit) different from the control unit 204.

Further, in the case where the communication with an external device is performed via an external communication device having the function and configuration similar to those of the communication unit 202, the authentication apparatus 200 according to the present embodiment does not have to include the communication unit 202.

The authentication apparatus 200 according to the present embodiment is applicable to various devices, such as a computer such as a server, capable of performing the processing relating to the control method in the authentication apparatus 200, for example. In addition, the present embodiment is also applicable to, for example, a processing IC that can be incorporated in the device as described above.

[2-3] Control Target 300

The control target 300 is a target device to be controlled by the processing relating to the control method in the control apparatus 100.

Examples of the control target 300 include a moving object such as an automobile, any device related to machine-to-machine (M2M), and any device related to the Internet of things (IoT). In addition, the control target 300 may be a component of a portion of the device as described above, such as an electronic control unit (ECU) provided, for example, in an automobile, a battery provided in an automobile, or the like.

[2-4] Information Processing Apparatus 400

The information processing apparatus 400 plays a role in relaying communication between the control apparatus 100 and the authentication apparatus 200. The information processing apparatus 400 relays communication between the control apparatus 100 and the authentication apparatus 200 by using a communication device included therein or an external communication device connected thereto.

Further, the information processing apparatus 400 may play a role in executing an application corresponding to a service. The information processing apparatus 400 executes an application, for example, by one or two or more processors including an arithmetic circuit such as an MPU.

Examples of the information processing apparatus 400 include various devices such as a communication device including mobile phones and smartphones, a tablet device, a computer including personal computers (PCs), or the like.

[2-5] Application Server 500

The application server 500 manages, for example, various applications corresponding to services.

The application server 500 transmits, for example, on the basis of a request from the control apparatus 100, the information processing apparatus 400, or the like, data of an application corresponding to the request. In addition, the application server 500 makes the application usable, for example, on the basis of the request from the control apparatus 100, the information processing apparatus 400, or the like.

In addition, the application server 500 performs processing relating to the authentication of the provider of the application with the authentication apparatus 200.

Examples of the application server 500 include a computer such as a server.

The control system 1000 according to the present embodiment has, for example, the configuration illustrated in FIG. 1.

Here, the authentication apparatus 200 separately authenticates the provider of the service and the control apparatus 100, and in the case where each authentication is normally completed, the authentication apparatus 200 causes the authenticated information corresponding to the application to be recorded in the secure storage unit 106 of the control apparatus 100. In addition, the control apparatus 100 controls the control target 300 on the basis of the authenticated information stored in the secure storage unit 106.

Thus, the control system 1000 obtains, for example, the above-described three responsibility demarcation points. In addition, in the control system 1000, the authenticated application to be executed in the control apparatus 100, the information processing apparatus 400, or the like and the function of the control target 300 are correlated with each other.

Thus, for example, as illustrated in FIG. 1, by including the control apparatus 100 and the authentication apparatus 200, a control system capable of providing services by a plurality of service providers is achieved.

Note that, as described above, the configuration of the control system 1000 according to the present embodiment is not limited to the example illustrated in FIG. 1.

[3] Use Case Achievable by Using Control System 1000

Next, an example of a use case achievable by using the control system 1000 will be described. The case where the control target 300 is an automobile will be mainly described below as an example. Note that, as described above, needless to say, the control target 300 is not limited to an automobile.

[3-1] First Use Case: Application Example to Service for Calculating Insurance Premium Depending on Driving Situation of Automobile FIG. 9 is an explanatory diagram for describing a first example of a use case that is achievable by using the control system 1000 according to the present embodiment, and illustrates an application example to a service for calculating an insurance premium depending on driving situations of an automobile.

A case where the information processing apparatus 400 stores and executes various applications will be described below as an example. Note that, as described above, the control apparatus 100 may be configured to store and execute various applications.

Figure 9:
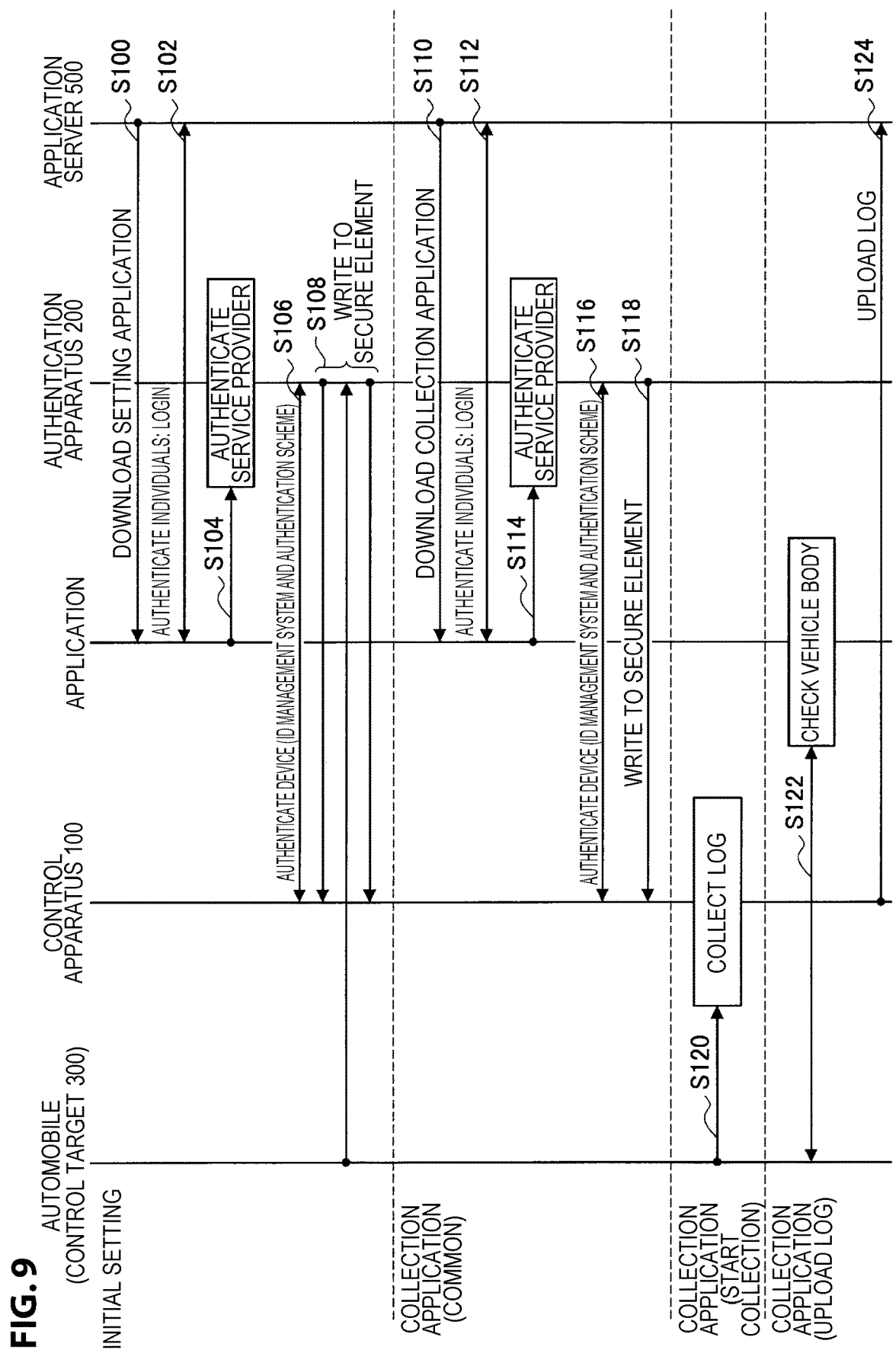
FIG. 9 is an explanatory diagram for describing a first example of a use case that is achievable by using the control system according to the present embodiment.

Further, in FIG. 9, the control apparatus 100 communicates with the authentication apparatus 200 or the application server 500, for example, via the information processing apparatus 400. Note that, needless to say, the control apparatus 100 is capable of communicating with the authentication apparatus 200 or the application server 500 via the network 600 (or directly).

The processing illustrated in FIG. 9 is divided, for example, into processing relating to initial setting (S100 to S108), processing relating to the setting of the collection application relating to the service for calculating the insurance premium depending on driving situations of an automobile (S110 to S118), and processing using the collection application ("S120" and "S122 and S124"). Note that, although FIG. 9 illustrates one application server 500 for the sake of convenience of description, the application server 500 for the processing relating to initial setting (S100 to S108) and the application server 500 for processing relating to the setting of the collection application (S110 to S118) may be different application servers.

First, the processing relating to initial setting (S100 to S108) is described.

The information processing apparatus 400 downloads the setting application from the application server 500 (S100), and authentication is performed between the setting application and the application server 500 by login or the like (S102).

The authentication apparatus 200 authenticates a service provider (corresponding to a provider of the setting application, hereinafter the same shall apply) relating to the setting application on the basis of an ID of the setting application or the like acquired from the information processing apparatus 400 (S104).

When the authentication of the service provider relating to the setting application is completed in step S104, the authentication apparatus 200 authenticates the control apparatus 100 by any authentication scheme (S106).

When the authentication of the control apparatus 100 is completed in step S106, the authentication apparatus 200 causes the secure element (the secure storage unit) of the control apparatus 100 to write the authenticated information corresponding to the setting application (S108). FIG. 9 illustrates an example in which the authentication apparatus 200 acquires identification information by transmitting an instruction to the control apparatus 100 to cause the identification information to be read from, for example, an automobile (the control target 300), and causes authenticated information generated by using the acquired identification information to be written in the secure element.

In the first use case, in the control system 1000, as the processing relating to initial setting, the processing of S100 to S108 described above is performed. Note that, needless to say, the processing relating to the initial setting is not limited to the processing of S100 to S108 described above.

Next, the processing (S110 to S118) relating to the setting of the collection application relating to the service for calculating the insurance premium depending on driving situations of an automobile will be described.

The information processing apparatus 400 downloads the collection application from the application server 500 (S110), and authentication is performed between the collection application and the application server 500 by login or the like (S112).

The authentication apparatus 200 authenticates a service provider (corresponding to a provider of the collection application, hereinafter the same shall apply) relating to the collection application on the basis of an ID of the collection application or the like acquired from the information processing apparatus 400 (S114).

When the authentication of the service provider relating to the collection application is completed in step S114, the authentication apparatus 200 authenticates the control apparatus 100 by any authentication scheme (S116).

When the authentication of the control apparatus 100 is completed in step S116, the authentication apparatus 200 causes the secure element (the secure storage unit) of the control apparatus 100 to write the authenticated information corresponding to the collection application (S118).

In the first use case, in the control system 1000, as the processing relating to the setting of the collection application, the processing of S110 to S118 described above is performed. Note that, needless to say, the processing relating to the setting of the collection application is not limited to the processing of S100 to S108 described above.

Next, the processing using the collection application will be described.

The control apparatus 100 controls execution of the collection application on the basis of the authenticated information corresponding to the collection application stored in the secure element, and acquires various data such as driving data from the automobile by the collection application to be executed (S120). The acquired various data are associated with, for example, VID (example of identification information) acquired from an automobile, and are stored, as log data, in a recording medium corresponding to the secure element or another storage unit. Here, for example, in a case where the data recording in the secure element is permitted by the authenticated information, the log data is recorded in the secure element.

In uploading the collected log data to the application server 500, the collection application executed by the information processing apparatus 400 checks the vehicle body by comparing the VID stored in the secure element with the VID acquired from the automobile (S122). Then, the collection application executed by the information processing apparatus 400 transmits the log data corresponding to the checked vehicle body to the application server 500 corresponding to the collection application (S124).

The application server 500 (or another server of the provider of the service) that has acquired the log data transmitted in step S124 calculates the insurance premium by analyzing the log data.

By performing the processing illustrated in FIG. 9, it is possible to provide the log data for the service provider after the validity of the automobile (control target 300) is guaranteed by checking the vehicle body using the VID. Thus, by performing the processing illustrated in FIG. 9, it is possible to achieve the service for calculating the insurance premiums depending on the driving situation of the automobile, which has further improved reliability and accuracy.

Note that, needless to say, the processing relating to the application to the service for calculating the premium depending on the driving situation of the automobile is not limited to the example illustrated in FIG. 9.

[3-2] Second Use Case: Application Example to Service for Performing Trouble Diagnosis of Automobile FIG. 10 is an explanatory diagram for describing a second example of the use case that is achievable by using the control system 1000 according to the present embodiment, and illustrates an application example to a service for performing trouble diagnosis of an automobile.

Similarly to FIG. 9, a case where the information processing apparatus 400 stores and executes various applications will be described below as an example. Note that, as described above, the control apparatus 100 may be configured to store and execute various applications.

Figure 10:
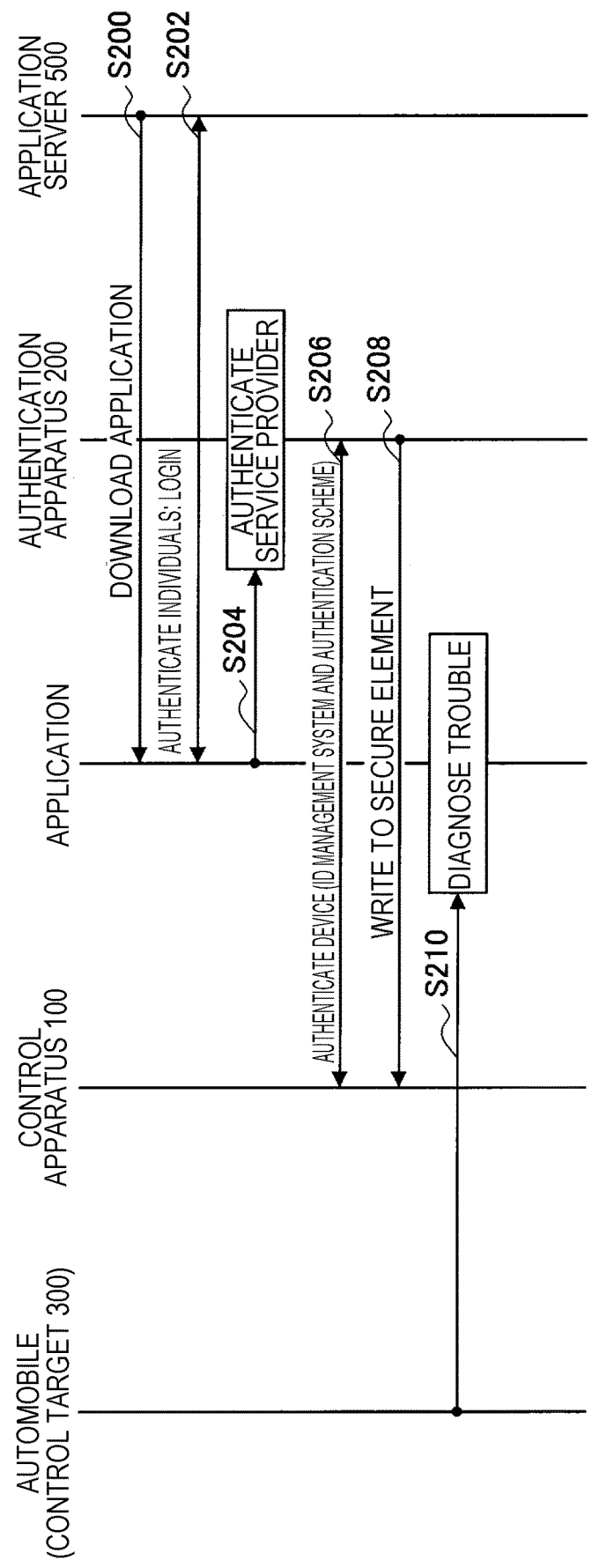
FIG. 10 is an explanatory diagram for describing a second example of a use case that is achievable by using the control system according to the present embodiment.

Further, in FIG. 10, the control apparatus 100 and the authentication apparatus 200 or the application server 500 may communicate with each other, for example, via the information processing apparatus 400, which is similar to FIG. 9, or via the network 600 (or directly).

The information processing apparatus 400 downloads the application relating to a service from the application server 500 (S200), and authentication is performed between the application relating a service and the application server 500 by login or the like (S202).

The authentication apparatus 200 authenticates a service provider (corresponding to a provider of the application relating a service, hereinafter the same shall apply) relating to the application relating to a service on the basis of an ID of the application relating to a service or the like acquired from the information processing apparatus 400 (S204).

When the authentication of the service provider relating to the application relating a service is completed in step S204, the authentication apparatus 200 authenticates the control apparatus 100 by any authentication scheme (S206).

When the authentication of the control apparatus 100 is completed in step S206, the authentication apparatus 200 causes the secure element (the secure storage unit) of the control apparatus 100 to write the authenticated information corresponding to the application relating to a service (S208).

The control apparatus 100 controls execution of the application relating to the service on the basis of the authenticated information corresponding to the application relating to the service stored in the secure element, and the trouble of an automobile (control target 300) is diagnosed by the application relating to the service (S210). Here, the application relating to the service, for example, acquires a trouble code such as a diagnostic trouble code (DTC) from the automobile and diagnoses trouble of the automobile by checking the state of the automobile with the acquired trouble code.

By performing the processing illustrated in FIG. 10, trouble diagnosis of the automobile (control target 300) becomes possible.

Further, by performing the processing illustrated in FIG. 10, the service of the service provider (provider of the application) authenticated in the authentication apparatus 200 becomes effective, but the service of the service provider that is not authenticated in the authentication apparatus 200 does not become effective. Thus, for example, it is possible for the user of an automobile to receive the trouble diagnosis of the automobile by using a reliable service (e.g., a service the user is requesting or a service contracted by the user).

Note that, needless to say, the processing relating to the application to the service for performing trouble diagnosis of the automobile is not limited to the example illustrated in FIG. 10.

Further, by the processing similar to the processing illustrated in FIG. 10, for example, it is possible to deal with services of different industries, such as a road service of a dealer, an automobile supply shop, and an insurance company.

[3-3] Third Use Case: Application Example to Automobile Operation Management Service FIG. 11 is an explanatory diagram for describing a third example of the use case that is achievable by using the control system 1000 according to the present embodiment, and illustrates an application example to an automobile operation management service.

Similarly to FIG. 9, a case where the information processing apparatus 400 stores and executes various applications will be described below as an example. Note that, as described above, the control apparatus 100 may be configured to store and execute various applications.

Figure 11:
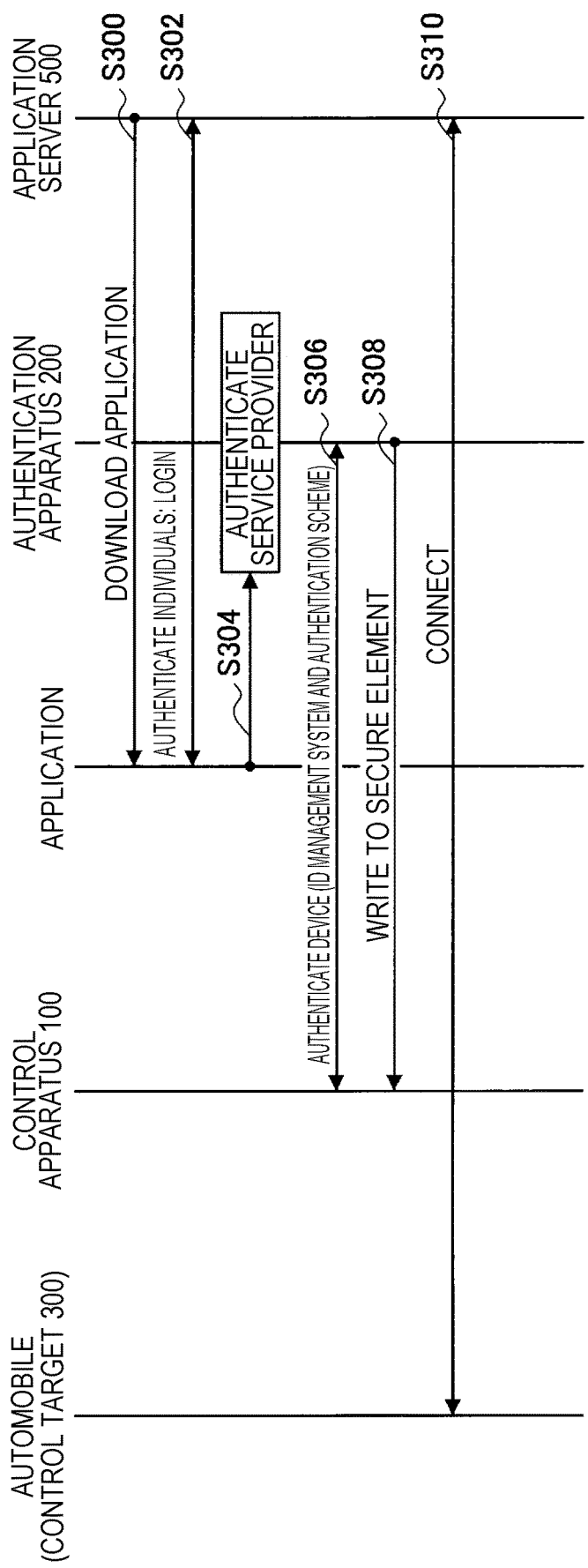
FIG. 11 is an explanatory diagram for describing a third example of a use case that is achievable by using the control system according to the present embodiment.

Further, in FIG. 11, the control apparatus 100 and the authentication apparatus 200 or the application server 500 may communicate with each other, for example, via the information processing apparatus 400, which is similar to FIG. 9, or via the network 600 (or directly).

The information processing apparatus 400 downloads the application relating to a service from the application server 500 (S300), and authentication is performed between the application relating a service and the application server 500 by login or the like (S302).

The authentication apparatus 200 authenticates a service provider (corresponding to a provider of the application relating a service, hereinafter the same shall apply) relating to the application relating to a service on the basis of an ID of the application relating to a service or the like acquired from the information processing apparatus 400 (S304).

When the authentication of the service provider relating to the application relating a service is completed in step S304, the authentication apparatus 200 authenticates the control apparatus 100 by any authentication scheme (S306).

When the authentication of the control apparatus 100 is completed in step S306, the authentication apparatus 200 causes the secure element (the secure storage unit) of the control apparatus 100 to write the authenticated information corresponding to the application relating to a service (S308).

The control apparatus 100 controls execution of the application relating to the service on the basis of the authenticated information corresponding to the application relating to the service stored in the secure element, and the automobile (control target 300) and the application server 500 relating to the service are connected by the application relating to the service (S310).

The application relating to the service to be executed causes the automobile and the application server 500 relating to the service to be connected, for example, by controlling the communication between the automobile and the application server 500 relating to the service. In addition, the application relating to the service to be executed causes, for example, various data such as driving data to be transmitted from the automobile to the application server 500. In addition, the application relating to the service to be executed may cause the position information corresponding to the position of the automobile, such as position information acquired, for example, from an automobile, the information processing apparatus 400, or the like, to be transmitted to the application server 500. The position information is obtained by using any method capable of specifying a position, such as a method using global navigation satellite system (GNSS) or a method using communication with a base station, for example.

The application server 500 (or another server of the provider of the service, or the information processing apparatus 400) that has acquired the various data transmitted in step S310 performs the automobile operation management by analysis or the like of various data.

By performing the processing illustrated in FIG. 11, the automobile operation management service is achieved. In addition, the application relating to the service is executed on the basis of the authenticated information that is authenticated in the authentication apparatus 200, and various types of information are transmitted to the application server 500 by the application relating to the service. Thus, for example, it is possible for the user of an automobile to receive the automobile operation management service in a state in which the data access function based on authentication is working (e.g., in the control system 1000 where the processing illustrated in FIG. 11 is performed, personal information included in various data is managed by the service provider).

Note that, needless to say, the processing relating to the application to the automobile operation management service is not limited to the example illustrated in FIG. 11.

[3-4] Other Use Cases

By performing the processing relating to the control method according to the present embodiment, it is possible for the control apparatus 100 to perform control the control target on the basis of the authenticated information that is authenticated in the authentication apparatus 200.

For example, assuming that the control target is an automobile, by performing the processing relating to the control method according to the present embodiment, it is possible to acquire various types of information that is obtainable from the automobile by an application authenticated in the authenticating device 200. Thus, various functions, which have been conventionally achieved in the dedicated device, can be achieved by the control system 1000 in which the processing relating to the control method according to the present embodiment is performed.

To give a specific example, the control system 1000 makes it possible to use, for example, car sharing, rental, keyless entry, or the like.

Further, as described above, the access restriction depending on the state of the control target may be set to the information used for generation of the authenticated information. In the case of using the information used for generation of the authenticated information to which the access restriction depending on the state of the control target is set, it is possible to set the access restriction depending on the state of the control target to the authenticated information. The access restriction described above is set, for example, by the metadata of the authenticated information, but the above-described method of setting the access restriction is not limited to the above.

For example, to give an example in the case where the control target is an automobile, by setting the access restriction depending on the state of the control target to the authenticated information, it is possible to further achieve the access control to data depending on the condition satisfied by the control target, such as the access control to data during driving, or access control to data at a fixed speed or less, for example. That is, the processing relating to the control method according to the present embodiment makes it possible to classify the data access by function, manage the use of each function, and classify the data access format by function.

Here, it is possible to specify the state of the automobile that is the control target, for example, by using the log data obtained by the processing illustrated in FIG. 9. In addition, the state of the automobile that is the control target may be estimated by detection data of a motion sensor (e.g., an acceleration sensor, a gyro sensor, or the like) included in the control apparatus 100 or a motion sensor connected to the control apparatus 100.

Examples of use cases that are achievable by using the control system 1000 include the examples described in [3-1] to [3-4] above. Note that, needless to say, examples of use cases that are achievable by using the control system 1000 are not limited to the examples described above.

(Program According to Present Embodiment)

[I] Program for Functioning as Control Apparatus According to Present Embodiment A program for causing a computer to function as the control apparatus according to the present embodiment (e.g., a program capable of executing the processing relating to the control method in the control apparatus 100) is executed by a processor or the like in the computer. Thus, it is possible to achieve the control system capable of providing services by a plurality of service providers.

Further, execution of the program for causing the computer to function as the control apparatus according to the present embodiment by the processor or the like in the computer makes it possible to have the effect exerted by the processing relating to the control method in the control apparatus 100 as described above.

[II] Program for Functioning as Authentication Apparatus According to Present Embodiment A program for causing a computer to function as the authentication apparatus according to the present embodiment (e.g., a program capable of executing the processing relating to the control method in the authentication apparatus 200) is executed by a processor or the like in the computer. Thus, it is possible to achieve the control system capable of providing services by a plurality of service providers.

Further, execution of the program for causing the computer to function as the authentication apparatus according to the present embodiment by the processor or the like in the computer makes it possible to have the effect exerted by the processing relating to the control method in the authentication apparatus 200 as described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the control apparatus according to the present embodiment is provided, but the present embodiment can further provide a recording medium in which the above-described program is stored together.

Further, it has been illustrated above, for example, that a program (computer program) that causes a computer to function as the authentication apparatus according to the present embodiment is provided, but the present embodiment can further provide a recording medium in which the above-described program is stored together.

The above-described configurations express examples of the present embodiment and, of course, pertain to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

A control apparatus including:

a secure storage unit; and a processing unit configured to control a control target on a basis of authenticated information that is stored in the secure storage unit and is authenticated by an authentication apparatus.

(2)

The control apparatus according to (1), in which the processing unit controls the control target by controlling execution of an application on the basis of the authenticated information.

(3)

The control apparatus according to (2), in which the processing unit restricts execution of an application that is not authenticated by the authentication apparatus on the basis of the authenticated information.

(4)
The control apparatus according to (2) or (3),
in which the processing unit permits execution of an application that is authenticated by the authentication apparatus on the basis of the authenticated information.
(5)
The control apparatus according to any one of (2) to (4),
in which the processing unit, in a case where processing of the executed application is terminated, causes processing termination information indicating that the processing of the application is terminated to be transmitted to the authentication apparatus.
(6)
The control apparatus according to any one of (2) to (5),
in which the processing unit controls the control target by further controlling a function of the control target on the basis of the authenticated information.
(7)
The control apparatus according to (6),
in which the processing unit restricts the function of the control target that is not authenticated by the authentication apparatus on the basis of the authenticated information.
(8)
The control apparatus according to (6) or (7),
in which the processing unit enables the function of the control target that is authenticated by the authentication apparatus on the basis of the authenticated information.
(9)
The control apparatus according to any one of (1) to (8),
in which recording of the authenticated information in the secure storage unit and updating or deletion of the authenticated information stored in the secure storage unit are performed by an instruction acquired from the authentication apparatus.
(10)
An authentication apparatus including:
a processing unit configured to separately authenticate a provider of an application and a control apparatus including a secure storage unit, and, in a case where each authentication is normally completed, to cause authenticated information corresponding to the application to be recorded in the secure storage unit of the control apparatus.
(11)
The authentication apparatus according to (10),
in which the processing unit causes the authenticated information corresponding to identification information to be recorded in the secure storage unit, the identification information indicating a control target that is a target to be controlled by the control apparatus and being acquired from the control apparatus.
(12)
The authentication apparatus according to (10) or (11),
in which the processing unit, in a case where processing termination information indicating that processing of an application executed on a basis of the authenticated information is terminated is acquired from the control apparatus, causes the authenticated information corresponding to an application indicated by the processing termination information to be deleted from the secure storage unit of the control apparatus.
(13)
A control system including:
a control apparatus; and
an authentication apparatus,
in which the control apparatus includes
a secure storage unit, and
a processing unit configured to control a control target on a basis of authenticated information that is stored in the secure storage unit and is authenticated by the authentication apparatus, and
the authentication apparatus includes
a processing unit configured to separately authenticate a provider of an application and the control apparatus, and, in a case where each authentication is normally completed, to cause authenticated information corresponding to the application to be recorded in the secure storage unit of the control apparatus.
(14)
A control method that is executed by a control apparatus, the method including:
a step of controlling a control target on a basis of authenticated information that is stored in a secure storage unit and is authenticated by an authentication apparatus.
(15)
A control method including:
a step of separately authenticating, by an authentication apparatus, a provider of an application and a control apparatus including a secure storage unit, and, in a case where each authentication is normally completed, causing authenticated information corresponding to the application to be recorded in the secure storage unit of the control apparatus; and
a step of controlling, by the control apparatus, a control target on a basis of authenticated information that is stored in a secure storage unit and is authenticated by the authentication apparatus.

REFERENCE SIGNS LIST

100 control apparatus
102 first communication unit
104 second communication unit
106 secure storage unit
108, 204 control unit
110, 210 processing unit
200 authentication apparatus
202 communication unit
300 control target
400 information processing apparatus
500 application server
600 network
1000 control system

The invention claimed is:

1. A control apparatus, comprising:
a receiver configured to receive first instruction from an authentication apparatus, wherein
the received first instruction indicates completion of an authentication process,
the authentication process corresponds to authentication of a plurality of providers of a plurality of applications, and
the plurality of applications is associated with a control target;
a secure storage element configured to store identification information indicating the control target, authentication information indicating the control apparatus, and authenticated information indicating the plurality of applications, wherein the authenticated information is stored based on the received first instruction; and
circuitry configured to control the control target based on the authenticated information, wherein the authenticated information is authenticated by the authentication apparatus.

2. The control apparatus according to claim 1, wherein the circuitry is further configured to:
control execution of a first application of the plurality of applications based on the authenticated information; and
control the control target based on the execution of the first application.

3. The control apparatus according to claim 2, wherein the circuitry is further configured to restrict execution of a second application of the plurality of applications based on the authenticated information, and
the second application is unauthenticated by the authentication apparatus.

4. The control apparatus according to claim 2, wherein the circuitry is further configured to permit the execution of the first application authenticated by the authentication apparatus, and
the execution is permitted based on the authenticated information.

5. The control apparatus according to claim 2, wherein the circuitry is further configured to:
determine termination of the executed first application; and
control transmission of processing termination information to the authentication apparatus based on the determination, wherein the processing termination information indicates that the executed first application is terminated.

6. The control apparatus according to claim 2, wherein the circuitry is further configured to control a function of the control target based on the authenticated information.

7. The control apparatus according to claim 6, wherein the circuitry is further configured to restrict the function of the control target based on the authenticated information, and
the function of the control target is unauthenticated by the authentication apparatus.

8. The control apparatus according to claim 6, wherein the circuitry is further configured to enable the function of the control target based on the authenticated information, and
the function of the control target is authenticated by the authentication apparatus.

9. The control apparatus according to claim 1, wherein the receiver is further configured to receive second instruction from the authentication apparatus,
the received second instruction indicates at least one of an update process or delete process,
the at least one of the update process or the delete process is associated with the authenticated information stored in the secure storage element, and
the circuitry is further configured to execute the at least one of the update process or the delete process based on the received second instruction.

10. An authentication apparatus, comprising:
circuitry configured to:
separately authenticate each of a provider of an application, and a control apparatus, wherein
the control apparatus includes a secure storage element,
the secure storage element is tamper resistant,
the secure storage element stores identification information indicating a control target, authentication information indicating the control apparatus, and authenticated information indicating a plurality of applications, and
the plurality of applications includes the application;
determine completion of the authentication of the each of the provider of the application and the control apparatus; and
cause the secure storage element, to record the authenticated information, based on the determination, wherein the authenticated information corresponds to the application.

11. The authentication apparatus according to claim 10, wherein
the authenticated information corresponds to the identification information,
the control target is controlled by the control apparatus, and
the identification information is acquired from the control apparatus.

12. The authentication apparatus according to claim 10, wherein the circuitry is further configured to:
acquire processing termination information from the control apparatus, wherein
the processing termination information indicates termination of the application, and
the application is executed based on the authenticated information; and
cause the secure storage element to delete the authenticated information corresponding to the application indicated by the processing termination information.

13. A control system, comprising:
a control apparatus; and
an authentication apparatus, wherein
the control apparatus includes:
a secure storage element that is tamper resistant, wherein the secure storage element is configured to store identification information indicating a control target, authentication information indicating the control apparatus, and authenticated information indicating a plurality of applications; and
first circuitry configured to control the control target based on the authenticated information, and
the authentication apparatus includes second circuitry configured to:
authenticate the authenticated information;
separately authenticate each of the control apparatus and a provider of an application of the plurality of applications;
determine completion of the authentication of the each of the control apparatus and the provider of the application; and
cause the secure storage element to record the authenticated information authenticated by the authentication apparatus, wherein
the secure storage element is caused to record the authenticated information based on the determination, and
the authenticated information corresponds to the application.

14. A control method, comprising:
receiving first instruction from an authentication apparatus, wherein
the received first instruction indicates completion of an authentication process,
the authentication process corresponds to authentication of a plurality of providers of a plurality of applications, and
the plurality of applications is associated with a control target;
storing, in a secure storage element, identification information indicating the control target, authentication information indicating a control apparatus, and authenticated information indicating the plurality of applications, wherein the authenticated information is stored based on the received first instruction; and controlling, by circuitry, the control target based on the authenticated information, wherein the authenticated information is authenticated by the authentication apparatus.

15. A control method, comprising:

authenticating, by an authentication apparatus, each of a provider of an application and a control apparatus, wherein the control apparatus is authenticated separately from the provider of the application, the control apparatus includes a secure storage element, and the secure storage element is tamper resistant;

storing, in the secure storage element, identification information indicating a control target, authentication information indicating the control apparatus, and authenticated information indicating a plurality of applications including the application;

authenticating, by the authentication apparatus, the authenticated information;

determining completion of the authentication of the each of the provider of the application and the control apparatus;

causing the secure storage element, to record the authenticated information, based on the determination, wherein the authenticated information corresponds to the application; and controlling, by the control apparatus, the control target based on the authenticated information authenticated by the authentication apparatus.

* * * * *